(12) United States Patent
Barel et al.

(10) Patent No.: US 10,173,463 B2
(45) Date of Patent: Jan. 8, 2019

(54) MOTORIZED WHEEL WITH SUSPENSION

(71) Applicant: SOFTWHEEL LTD., Tel Aviv (IL)

(72) Inventors: Daniel Barel, Tel Aviv (IL); Ahishay Sardes, Tel-Aviv (IL); Ran Dekel, Nofit (IL); Eran Starik, Ra'anana (IL); Tomer Segev, Tel-Aviv (IL)

(73) Assignee: SOFTWHEEL LTD, Tel Aviv (IL)

( * ) Notice: Subject to any disclaimer, the term of this patent is extended or adjusted under 35 U.S.C. 154(b) by 0 days.

(21) Appl. No.: 14/785,389

(22) PCT Filed: Apr. 17, 2014

(86) PCT No.: PCT/IB2014/000580
§ 371 (c)(1),
(2) Date: Oct. 19, 2015

(87) PCT Pub. No.: WO2014/170745
PCT Pub. Date: Oct. 23, 2014

(65) Prior Publication Data
US 2016/0068016 A1 Mar. 10, 2016

Related U.S. Application Data

(60) Provisional application No. 61/814,219, filed on Apr. 20, 2013.

(51) Int. Cl.
*B60B 9/02* (2006.01)
*A61G 5/10* (2006.01)
(Continued)

(52) U.S. Cl.
CPC .............. *B60B 9/02* (2013.01); *A61G 5/1078* (2016.11); *B60B 9/24* (2013.01); *B60B 9/28* (2013.01);
(Continued)

(58) Field of Classification Search
CPC .... B60B 9/02; B60B 9/24; B60B 9/28; B60K 7/0007; B60K 2007/0092; A61G 5/1078; F16F 1/128; F16F 9/0245; F16F 15/022
See application file for complete search history.

(56) References Cited

U.S. PATENT DOCUMENTS 926,830 A 7/1909 Sinnott
1,083,864 A 1/1914 Shailer
(Continued)

FOREIGN PATENT DOCUMENTS

CN 2157878 Y 3/1994
CN 201214359 Y 4/2009
(Continued)

OTHER PUBLICATIONS

Jun. 18, 2012 International Search Report issued in International Patent Application No. PCT/IB2012/000100.
(Continued)

*Primary Examiner* — Kip T Kotter
(74) *Attorney, Agent, or Firm* — Pearl Cohen Zedek Latzer Baratz LLP

(57) ABSTRACT

A wheel comprises a rim, a hub and a suspension unit. The wheel incorporates or is connectable to a torque source capable of producing torques up to a maximal torque for rotating the wheel around a rotation-axis. In this invention, the suspension unit includes at least one structural member, provided at least partially between the rim and the hub, configured to change in size and/or shape, relative to a nominal size and/or shape thereof, during displacements and/or rotations of the hub relative to a center point of the rim. The suspension unit also includes at least one motion resisting component adapted to retain the structural member at the nominal size and/or shape thereof under torques smaller than the maximal torque.

15 Claims, 9 Drawing Sheets

(51) Int. Cl.
  *B60K 7/00* (2006.01)
  *F16F 15/02* (2006.01)
  *B60B 9/24* (2006.01)
  *B60B 9/28* (2006.01)
  *F16F 1/12* (2006.01)
  *F16F 9/02* (2006.01)
  *B60G 3/01* (2006.01)
  *B60B 27/00* (2006.01)

(52) U.S. Cl.
  CPC ............ *B60G 3/01* (2013.01); *B60K 7/0007* (2013.01); *F16F 1/128* (2013.01); *F16F 9/0245* (2013.01); *F16F 15/022* (2013.01); *B60B 27/0015* (2013.01); *B60B 2900/313* (2013.01); *B60G 2200/422* (2013.01); *B60G 2204/30* (2013.01); *B60G 2204/4222* (2013.01); *B60G 2300/24* (2013.01); *B60G 2300/50* (2013.01); *B60K 2007/0092* (2013.01); *F16F 2228/08* (2013.01); *F16F 2228/10* (2013.01)

(56) References Cited

U.S. PATENT DOCUMENTS

| | | | |
|---|---|---|---|
| 1,132,787 A | 3/1915 | Mansfield |
| 1,133,973 A | 3/1915 | Koch |
| 1,189,963 A | 7/1916 | Jones |
| 1,193,733 A | 8/1916 | Stringfellow |
| 1,267,876 A | 5/1918 | Kovacs |
| 1,397,839 A | 11/1921 | Livings |
| 1,416,078 A | 5/1922 | Taylor |
| 1,468,714 A | 9/1923 | Grossman |
| 1,495,699 A | 5/1924 | Kunoki |
| 1,584,679 A | 5/1926 | Stoltz |
| 1,672,090 A | 6/1928 | Ringstod |
| 1,673,056 A | 6/1928 | Stoltz |
| 1,979,935 A | 11/1934 | Henap |
| 2,238,410 A | 4/1941 | Capuciati |
| 2,639,140 A | 5/1953 | Frenkel |
| 3,896,868 A | 7/1975 | Leo |
| 4,310,149 A | 1/1982 | Camilleri |
| 4,465,321 A | 8/1984 | Berg |
| 4,782,875 A | 11/1988 | Jones |
| 4,840,357 A | 6/1989 | Jouade |
| 4,872,651 A | 10/1989 | Thorn |
| 4,903,792 A | 2/1990 | Ze-ying |
| 5,104,201 A | 4/1992 | Ross |
| 5,141,173 A | 8/1992 | Lay |
| D401,204 S | 11/1998 | Al-Sabah |
| 6,041,838 A | 3/2000 | Naser |
| 6,257,604 B1 | 7/2001 | Laurent et al. |
| 6,286,616 B1* | 9/2001 | Kutter .................. B62M 6/40 180/206.5 |
| 6,357,770 B1 | 3/2002 | Carpiaux et al. |
| 6,386,529 B2 | 5/2002 | Bik et al. |
| 6,588,473 B1 | 7/2003 | Walrond |
| 6,698,480 B1 | 3/2004 | Cornellier |
| 6,991,076 B2 | 1/2006 | McAndrews |
| 7,441,757 B2 | 10/2008 | Siemer et al. |
| 7,537,228 B2 | 5/2009 | Shimizu et al. |
| 7,699,326 B2 | 4/2010 | Yamada |
| 7,810,533 B2 | 10/2010 | Wichern |
| 7,874,512 B2 | 1/2011 | Xu |
| 8,037,957 B2 | 10/2011 | Laurent |
| 8,127,810 B2 | 3/2012 | Wichern |
| 8,240,689 B2 | 8/2012 | Holt et al. |
| 8,863,794 B2 | 10/2014 | Wichern |
| 2006/0012144 A1 | 1/2006 | Kunzler et al. |
| 2010/0218865 A1 | 9/2010 | Kim |
| 2010/0219572 A1 | 9/2010 | Back |
| 2011/0209938 A1 | 9/2011 | Basadzishvili |
| 2012/0150377 A1* | 6/2012 | Buchheim .............. B62M 6/50 701/22 |
| 2013/0312464 A1 | 11/2013 | Davis |
| 2013/0340902 A1 | 12/2013 | Kemeny |
| 2014/0034198 A1 | 2/2014 | Wichern |
| 2014/0060715 A1 | 3/2014 | Winshtein et al. |

FOREIGN PATENT DOCUMENTS

| | | |
|---|---|---|
| DE | 235200 C | 6/1911 |
| DE | 3222262 A1 | 12/1983 |
| DE | 19983290 | 6/2001 |
| DE | 102005032537 A1 | 1/2007 |
| EP | 0432079 A2 | 6/1991 |
| EP | 1029711 A2 | 8/2000 |
| FR | 351455 A | 7/1905 |
| FR | 464426 A | 3/1914 |
| FR | 614407 A | 12/1926 |
| FR | 730768 A | 8/1932 |
| FR | 1105719 | 12/1955 |
| FR | 2795947 A1 | 1/2001 |
| FR | 2898077 A1 | 9/2007 |
| GB | 191124962 A | 4/1912 |
| GB | 191211637 A | 1/1913 |
| GB | 191217140 A | 5/1913 |
| GB | 191306920 A | 7/1913 |
| GB | 1549611 A | 8/1979 |
| GB | 2188596 A | 10/1987 |
| GB | 2331966 A | 6/1999 |
| JP | 257225 | 4/1914 |
| JP | 35975 | 5/1924 |
| JP | S61207202 A | 9/1986 |
| JP | H04368203 A | 12/1992 |
| WO | 9715461 A1 | 5/1997 |
| WO | 0176351 A1 | 10/2001 |
| WO | 2005007497 A1 | 1/2005 |
| WO | 2006128291 A1 | 12/2006 |
| WO | 2009/029990 A1 | 3/2009 |
| WO | 2012153170 A1 | 11/2012 |
| WO | 2013061121 A1 | 5/2013 |

OTHER PUBLICATIONS

Sep. 22, 2014 International Search Report issued in International Patent Application No. PCT/IB2014/000580.

* cited by examiner

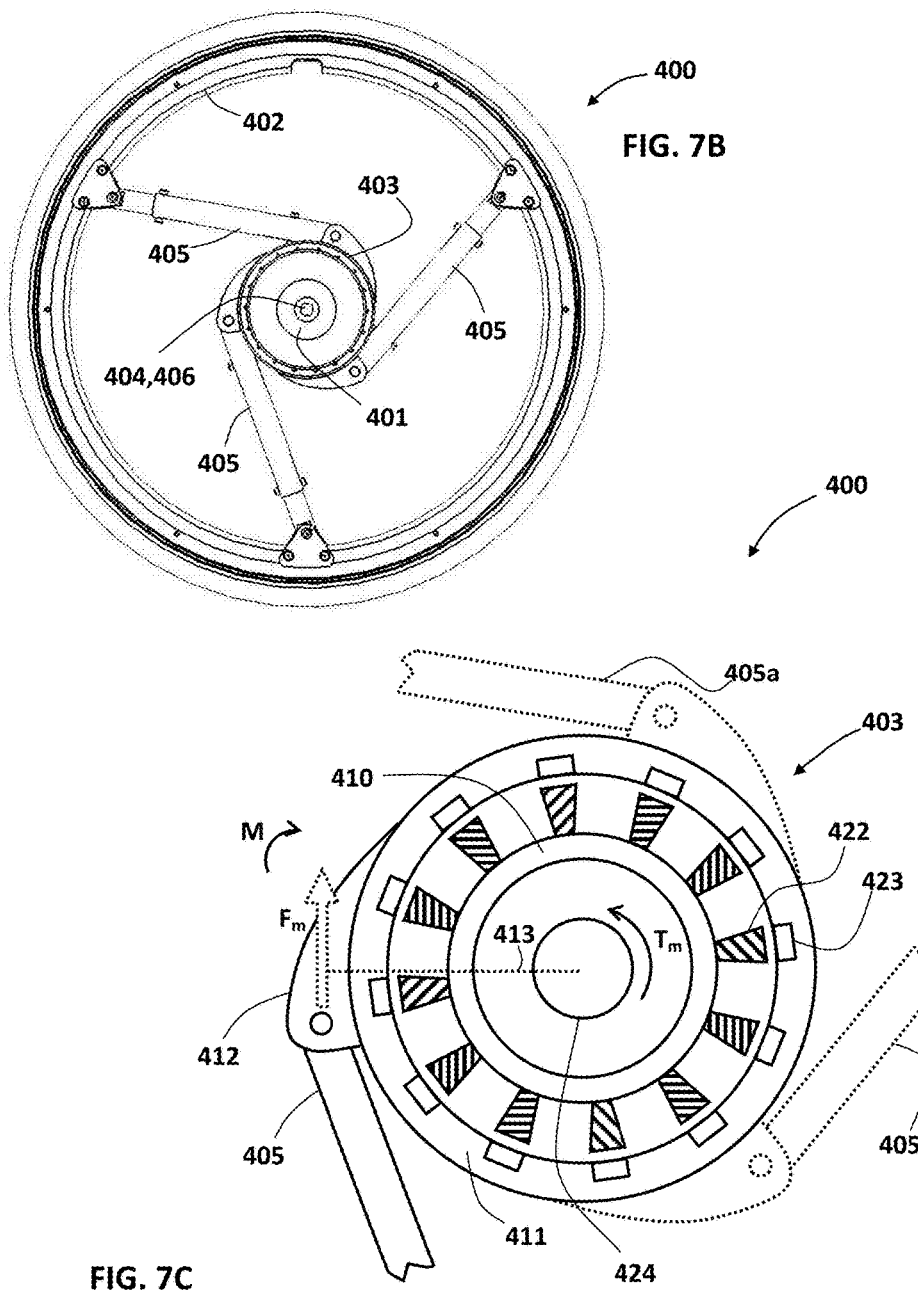

MOTORIZED WHEEL WITH SUSPENSION

RELATED APPLICATION

This application is a U.S. National Stage Entry Under 35 U.S.C. 371 of International Application No. PCT/IB2014/000580 filed on Apr. 17, 2014, which claims the benefit of priority under 35 U.S.C. § 119(e) from U.S. Provisional Patent Application No. 61/814,219 filed on Apr. 20, 2013 and entitled "In-Wheel Suspension for Motorized Vehicles", the disclosure of which is incorporated herein by reference in its entirety.

FIELD AND BACKGROUND OF THE INVENTION

The present invention, in some embodiments thereof, relates to suspension systems for vehicles, and in particular to suspension systems having selective activation according to parameters of the impact or perturbation.

Rotating masses tend to accommodate vibrations and shocks due to internal and/or external forces and impacts from surfaces in contact. One example is the vibratory motion of a wheel when it travels a distance on a non-purely smooth surface. Motorized and other vehicles commonly include suspension systems in order to protect their chassis or other affiliated parts from early failure as well as to avoid unpleasant conditions to passengers. Suspension systems, mostly including springs and damping elements, are commonly connected to static parts of the machine or vehicle, on one end, and in direct contact with the axle or other elements that provide a stable axis of rotation to the rotating mass or rotator. For example, a wheel that travels over a rough surface will transfer axial, vertical and other forces (e.g., impacts and/or vibratory) to the axle, which will be partially absorbed and diminished using suspension means that can be located between the axel and the chassis. Several attempts are known for implementing suspension mechanisms inside the wheels.

Wheels provided with embedded suspension is supposed to have unique advantages in several factors, including improved ratio of sprung to unsprung weight of the entire vehicle, ability to absorb shocks closer to shock origin on the road, suspension unit that can be plugged-in to a chassis of different designs and shapes insensitive to suspension implementation, and optionally also increase of vehicle's volume to weight ratio. In case of in-wheel suspension rotatable with the wheel there is also an advantage of symmetrical suspension which is insensitive to shock direction and/or vehicle's velocity/acceleration direction as opposed to non-rotatable and/or frame-based suspension which are substantially linear in nature.

In case of motorized or driving wheels incorporating in-wheel suspension, several factors are to be considered as well with respect to suspension selective operation, including torque magnitudes originating from a power source and acting on wheel center, substantial accelerations and decelerations, breakings and/or wheel traction.

SUMMARY OF THE INVENTION

According to an aspect of some embodiments of the present invention, there is provided a wheel rotatable around a rotation-axis and incorporating or connectable to a torque source. In some embodiments the wheel includes a rim, a hub and a suspension unit provided at least partially between the rim and the hub. In some embodiments, the rim is concentric with the rotation-axis when the structural member is at the nominal size and/or shape. In some embodiments, the hub includes a hub motor and comprising a stator member and a rotor member. Optionally, the structural member connects the rim and the rotor member. In some embodiments, the rim or the hub is fixedly connected or connectable to a drive shaft, such as a CV joint, adapted to transfer the torques thereto.

In some embodiments, the suspension unit is configured to dissipate kinetic energy during radial displacements between the rim and the hub. In some embodiments, the suspension unit includes at least one structural member. Optionally, the structural member is changeable in size and/or shape relative to a nominal size and/or shape thereof. Optionally, the suspension unit includes at least three structural members rotationally-symmetric around the rotation-axis.

In some embodiments, the suspension unit includes at least one motion resisting component adapted to retain the structural member at the nominal size and/or shape thereof under torques produced by the torque source. In some embodiments, the structural member includes the motion resisting component. In some embodiments, the motion resisting component includes a suspension spring, such as a gas spring. Optionally, the suspension spring is provided preloaded to compress only at compressive forces acting thereto beyond a threshold value. Optionally, the structural member is configured to compress the suspension spring at lengthening thereof and at shortening thereof. Optionally, the structural member and/or motion resisting component protrudes from the rim. Optionally and alternatively, the structural member and/or motion resisting component lays within the rim boundaries. In some embodiments, the structural member is positioned eccentrically to the rotation-axis thereby allowing moment buildup resistive to a relative motion between the rim and the hub under the torque. Optionally, the relative motion includes a relative radial motion and/or a relative rotational motion. In some embodiments, the structural member includes a damper adapted to dissipate kinetic energy to heat during the radial displacements. In some embodiments, the motion resisting component is adapted to retain the nominal size and/or shape under a predetermined maximal torque produced by the torque source.

In some embodiments, the wheel includes a traction unit connected or connectable to a vehicle chassis. In some embodiments, the traction unit includes a traction spring configured to partially compress but not fully compress upon vehicle's own weight when all vehicles wheels are horizontally leveled. Optionally, alternatively or additionally, the traction spring is configured to partially compress but not fully compress upon a maximal allowed complete weight of vehicle and load. In some embodiments, the suspension spring is provided preloaded to compress only at compressive forces acting thereto beyond a threshold value. Optionally, the threshold value relates to a threshold weight being equal or greater than a minimal weight necessary to fully compress the traction spring and/or to a threshold weight being equal or greater than vehicle's own weight and below a minimal weight necessary to fully compress the traction spring and/or to a threshold force being equal or greater than a chosen threshold breaking value and/or to a threshold acceleration being equal or greater than a chosen comfortable acceleration or braking magnitude, such as equal or greater than 2 m/sec$^2$ and/or to a threshold acceleration being equal or greater than a chosen emergency braking magnitude, such as equal or greater than 5 m/sec$^2$.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 7A-G illustrate views of an exemplary wheel incorporating a torque source, in accordance with embodiments of the present invention.

DESCRIPTION OF EMBODIMENTS OF THE INVENTION

Figure 1:
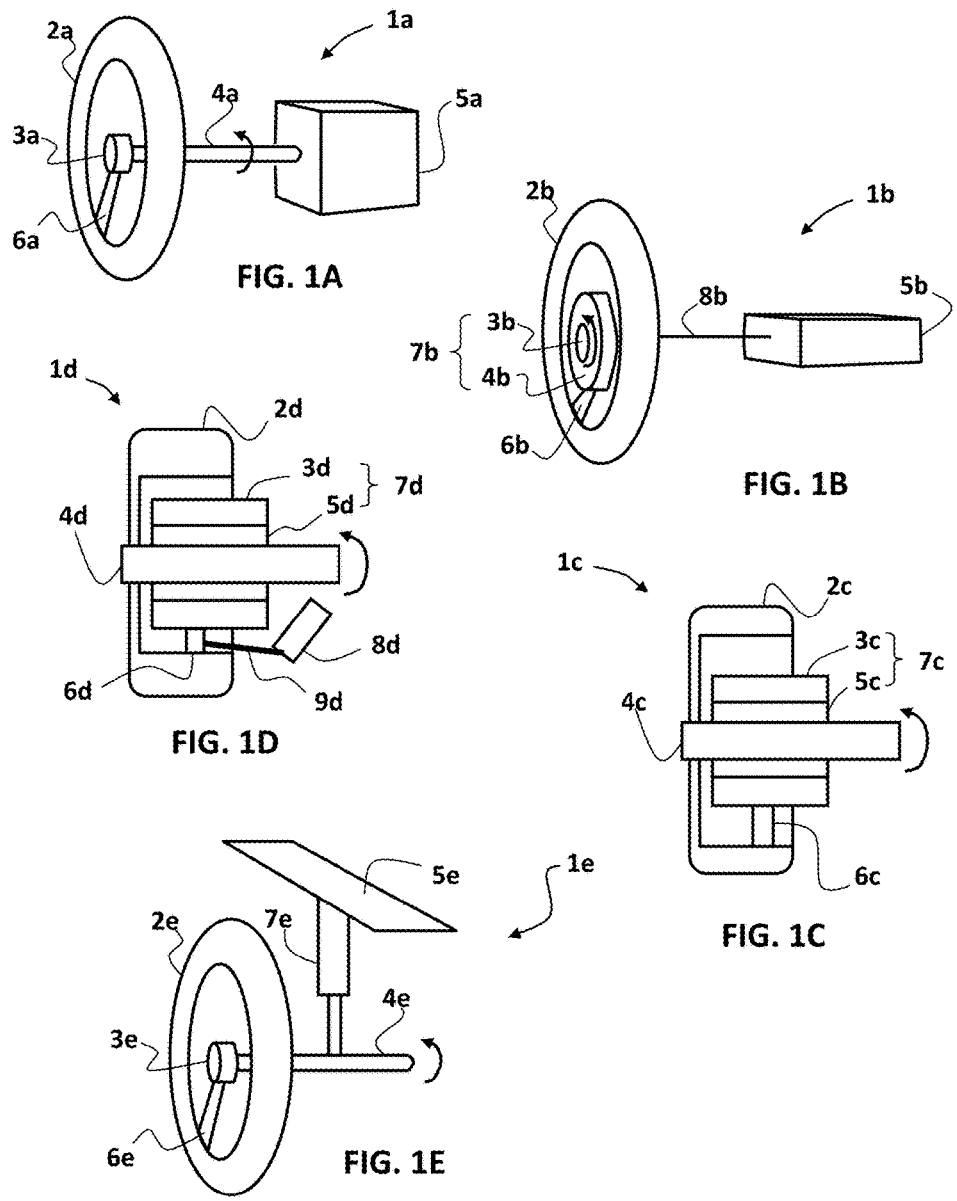
FIGS. 1A-E schematically illustrate different exemplary motorized wheels with in-wheel suspension, in accordance with embodiments of the present invention.

The following preferred embodiments may be described in the context of exemplary suspension mechanisms for vehicles such as motorized or power-assisted vehicles, for ease of description and understanding. However, the invention is not limited to the specifically described devices, and may be adapted to various applications without departing from the overall scope of the invention. For example, devices including concepts described herein may be used for suspension of any rotatable mass including rotors, flywheels, and wheels of self-propelled vehicles.

Wheels with embedded suspension, and particularly a suspension unit provided between wheel's hub and rim, are subject to continuous as well as sporadic forces and moments from different origins (including but not limited to impacts, shocks, falls, accelerations, braking, irregularities in torque and/or road, etc.) aiming to create relative motions between hub and rim normally provided concentric, such as radial and/or rotational motions. In designing and implementing an in-wheel suspension that will shift from a static (e.g., "rigid" or "non-absorbing") mode to an active (e.g., "elastic" or "shock-absorbing") mode and vice versa, optionally if a predetermined and/or pre-set threshold value is crossed, consideration should be made to different factors, in order that such relative motions between hub and rim will take place only as needed or requested, as it affects normal ride and for example usually less efficient in terms of propulsion energy utilization. These factors can be divided into external forces, mostly originating from the road or obstacles thereon, and internal forces, mostly originating from wheel and vehicle design and structure and dynamic behavior, and the forces and moments applied to a driving wheel from a torque source (e.g., a motor or an engine). Thought should be made also to specific factors, such as safety issues (as in the case of suspension activation during unsafe scenarios, such as emergency braking), energy loss and efficiency (considering that a higher threshold value is correlated with improved propulsion efficiency) and comfort (considering that different passengers may prefer different suspension rigidity and threshold).

International Patent Application PCT/IB2012/000530, the disclosure of which is fully incorporated herein by reference, presents in-wheel suspension designs incorporating selective suspension, in which the suspension operates to absorb a shock only upon demand and/or above a threshold magnitude. This concept allows wheel to remain rigid (e.g., having its structure and/or structural members maintain a shape and/or size), excluding a tire for example, during all or most ride, thereby diminishing unnecessary consumption of propulsion energy and potentially unpleasant springy sensation. International Patent Application PCT/IB2012/001994, the disclosure of which is fully incorporated herein by reference, describes symmetrical in-wheel suspension and/or centralizing units comprising structural members housing preloaded springs and/or dampers compressible both at compression and elongation of the structural members.

According to an aspect of some embodiments of the present invention, there is provided a wheel rotatable around a rotation-axis, the rotation-axis may be fixed or unfixed. The wheel may incorporate a torque source (e.g., a hub motor) or be connected or connectable to a torque source, as present in motorized (internal-combustion, electric, hybrid or other) vehicles. The wheel may be configured to a certain vehicle type or model, or to several others, including but not limited to wheelchairs (e.g., powered wheelchairs (PWC) or pushrim-activated power-assist wheelchairs (PAPAW)), mobility scooters, bicycles and electric bicycles (e.g., electric assist and/or power-on-demand), bikes such as scooters and motorcycles, cars and trucks, and others.

A wheel according to the present invention generally includes a rim, optionally wearing a tire, a hub and a suspension unit that is provided at least partially between the rim and the hub and configured to dissipate kinetic energy during radial displacements therebetween. As such, the entire suspension may be housed in the space between the rim and the hub, or at least part thereof may protrude elsewhere, for example away from rim boundaries and possibly towards vehicle's chassis. Optionally, the suspension unit includes at least one structural member, or optionally at least three structural members, changeable in size and/or shape relative to a nominal size and/or shape thereof. Optionally, the suspension unit includes at least one motion resisting component adapted to retain the structural member at its nominal size and/or shape under torques produced by the torque source.

In an aspect of some embodiments of the present invention, there is provided a wheel incorporating or connectable to a torque source capable of producing torques up to a maximal torque for rotating the wheel around a rotation-axis. In some embodiments, the wheel comprises a rim, a hub and suspension unit. In some embodiments, the suspension unit comprises:

(a) at least one structural member, provided at least partially between the rim and the hub, configured to change in size and/or shape, relative to a nominal size and/or shape thereof, during displacements and/or rotations of the hub relative to a center point of the rim, and (b) at least one motion resisting component adapted to retain the structural member at the nominal size and/or shape thereof under torques smaller than the maximal torque.

In some embodiments, the suspension unit further comprising a damper configured to dissipate kinetic energy during the displacements and/or rotations.

In some embodiments, the hub includes a hub motor comprising a stator member and a rotor member. Optionally, the at least one structural member connects the rim and the rotor member.

In some embodiments, the rim is connectable or fixedly connected to a drive shaft, such as a CV joint, adapted to transfer torques from the torque source to the rim. Optionally, alternatively or additionally, the hub is connectable or fixedly connected to a drive shaft, such as a CV joint, adapted to transfer torques from the torque source to the hub.

In some embodiments, the center point of the rim coincides with the rotation-axis when the at least one structural member is at the nominal size and/or shape thereof.

In some embodiments, the suspension unit comprises at least three structural members, including the at least one structural member, arranged rotationally-symmetric one with the other around the rotation-axis when the at least one structural member is at the nominal size and/or shape thereof.

In some embodiments, the at least one structural member and/or the at least one motion resisting component protrudes out of a space enclosed with inner boundaries of the rim. Optionally and alternatively, the at least one structural member and/or the at least one motion resisting component lays completely within a space enclosed with inner boundaries of the rim.

In some embodiments, the at least one structural member is configured and arranged to generate a continuous variable force, up to a maximal force, to a hub portion distant to the rotation-axis by a lever arm, wherein upon applying the maximal force to the hub portion a maximal resisting moment is created as a product of the maximal force and the lever arm, being equal or greater than the maximal torque and opposite in direction to the maximal torque.

In some embodiments, the at least one structural member comprises two longitudinal elements being slidably connected to each other, such that the at least one structural member is configured to extend or compress during the displacements and/or rotations.

In some embodiments, the at least one structural member comprises the at least one motion resisting component.

In some embodiments, the at least one motion resisting component comprises a suspension spring, such as a gas spring or a coil spring. Optionally, the suspension spring is provided preloaded at the nominal size and/or shape and configured to compress to a smaller length only under compression forces greater than a threshold value. Optionally, the at least one structural member is configured to compress the suspension spring both at lengthening thereof and at shortening thereof, relative to the nominal size and/or shape thereof.

In some embodiments, the at least one structural member comprises the damper. Optionally, the at least one motion resisting component comprises the damper.

In some embodiments, the wheel comprises a traction unit connected or connectable to a vehicle chassis. In some embodiments, the traction unit comprises a traction spring configured to partially compress but not fully compress upon vehicle's own weight when all vehicles wheels are horizontally leveled. In some embodiments, the traction spring is configured to partially compress but not fully compress upon a maximal allowed complete weight of vehicle and load.

In an aspect of some embodiments of the present invention, there is provided a wheel incorporating or connectable to a torque source capable of producing torques up to a maximal torque for rotating the wheel around a rotation-axis. In some embodiments, the wheel comprises a rim, a hub and a suspension unit. In some embodiments, the suspension unit includes at least one structural member, provided at least partially between the rim and the hub, configured to change in size and/or shape thereof, relative to a nominal size and/or shape thereof, during displacements and/or rotations of the hub relative to a center point of the rim. In some embodiments, the suspension unit further includes a traction unit connected to the hub at a first end thereof and connected or connectable to a vehicle chassis at a second end thereof.

In some embodiments, the traction unit comprises a traction spring configured to partially compress but not fully compress upon vehicle's own weight when all vehicles wheels are horizontally leveled. In some embodiments, the traction spring is configured to partially compress but not fully compress upon a maximal allowed complete weight of vehicle and load.

In some embodiments, the at least one structural member comprises a suspension spring, such as a coil spring or a gas spring. In some embodiments, the at least one structural member is configured to compress the suspension spring both at lengthening thereof and at shortening thereof relative to the nominal size and/or shape thereof.

In some embodiments, the suspension spring is provided preloaded at the nominal size and/or shape and configured to compress to a smaller length only under compression forces greater than a threshold value. Optionally, the threshold value relates to a threshold weight being equal or greater than a minimal weight necessary to fully compress the traction spring. Optionally, the threshold value relates to a threshold weight being equal or greater than vehicle's own weight and below a minimal weight necessary to fully compress the traction spring. Optionally, the threshold value relates to a threshold force being equal or greater than a chosen threshold breaking value. Optionally, the threshold value relates to a threshold acceleration being equal or greater than a chosen comfortable acceleration or braking magnitude, such as equal to or greater than 2 m/sec$^2$, or optionally to equal or greater than 5 m/sec$^2$.

In some embodiments, the suspension unit further comprising at least one motion resisting component adapted to retain the at least one structural member at the nominal size and/or shape thereof under torques equal to or smaller than the maximal torque. In some embodiments, the suspension unit further comprising a damper configured to dissipate kinetic energy during the displacements and/or rotations.

In an aspect of some embodiments according to the present invention, there is provided a wheel incorporating or connectable to a torque source capable of producing torques up to a maximal torque. In some embodiments, the wheel comprises a rim and a hub rotationally and/or radially fixed to the rim under torques smaller than the maximal torque and recoverably rotatable and/or displaceable relative to a center point of the rim under torques greater than the maximal torque.

In some embodiments, the hub includes a hub motor comprising a stator member and a rotor member.

In some embodiments, the wheel comprises at least one motion resisting component adapted to resist rotation and/or displacement of the hub relative to the center point of the rim. In some embodiments, the wheel comprises a damper configured to dissipate kinetic energy during displacements and/or rotations of the hub relative to the center point of the rim. In some embodiments, the wheel comprises at least one structural member changeable in size and/or shape thereof relative to a nominal size and/or shape thereof during displacements and/or rotations of the hub relative to the center point of the rim.

In some embodiments, the wheel comprises a traction unit connected or connectable to a vehicle chassis. Optionally, the traction unit comprises a traction spring configured to partially compress but not fully compress upon vehicle's own weight when all vehicles wheels are horizontally leveled. Optionally, the traction spring is configured to partially compress but not fully compress upon a maximal allowed complete weight of vehicle and load.

In an aspect of some embodiments according to the present invention, there is provided a wheel, which comprises a rim, a hub motor comprising a stator member and a rotor member, and at least one structural member positioned between the hub and the rim thereby providing a normally fixed distance therebetween. In some embodiments, the at least one structural member is adapted to retain the distance when stressed up to a threshold value and to recoverably alter the distance when stressed over the threshold value, the at least one structural member comprises a suspension spring, configured to compress from a nominal length, upon compression and upon elongation of the at least one structural member.

In some embodiments, the suspension spring is preloaded when in the nominal length thereof.

In some embodiments, the at least one structural member comprises a damper configured to dissipate kinetic energy during relative displacements and/or rotations of the hub motor relative to a center point of the rim.

In some embodiments, the wheel comprises a traction unit connected or connectable to a vehicle chassis. Optionally, the traction unit comprises a traction spring configured to partially compress but not fully compress upon vehicle's own weight when all vehicles wheels are horizontally leveled. Optionally, the traction spring is configured to partially compress but not fully compress upon a maximal allowed complete weight of vehicle and load.

In some embodiments, the at least one structural member comprises two longitudinal elements being slidably connected to each other.

In some embodiments, the at least one structural member comprises: an outer longitudinal element enclosing a lumen, comprising a first outer slit and a second outer slit; an inner longitudinal element slidable in the lumen, comprising a first inner slit and a second inner slit; a first sliding pin provided in the first outer slit and the first inner slit; and a second sliding pin provided in the second outer slit and the second inner slit. In some embodiments, the suspension spring is connected with a first end thereof to the first sliding pin and with a second end thereof to the second sliding pin.

In some embodiments, the slits are sized and arranged such that, at a central relative position between the outer longitudinal element and the inner longitudinal element, the first sliding pin and the second sliding pin are pushed by the suspension spring to a maximal distance. In some embodiments, at any non-central relative position between the outer longitudinal element and the inner longitudinal element, the first sliding pin and the second sliding pin are forced to approach each other to a distance smaller than the maximal distance, thereby compressing the suspension spring therebetween.

In some embodiments, the rotor member is connected at a first portion thereof to a first structural member, and at an evenly displaced second portion thereof to a second structural member substantially identical to the first structural member. In some embodiments, loading the hub motor, only if to a magnitude greater than a predetermined threshold value, will cause the first structural member to elongate and the second structural member to compress, such that a first suspension spring of the first structural member and a second suspension spring of the second structural member both compress so that a cumulative compression force thereof resists the loading.

In some embodiments, the at least one structural member is configured and arranged to generate a continuous variable force, up to a maximal force, to a hub portion distant to the rotation-axis by a lever arm, wherein upon applying the maximal force to the hub portion a maximal resisting moment is created as a product of the maximal force and the lever arm, being equal or greater than a maximal torque in a range of allowed torques, generatable by the hub motor, and opposite in direction to the maximal torque.

In an aspect of some embodiments, there is provided a wheelchair comprising at least one of the wheels described above.

In an aspect of some embodiments, there is provided a bicycle comprising at least one of the wheels described above.

In an aspect of some embodiments, there is provided a motorized vehicle, such as a car, comprising at least one of the wheels described above.

Referring now to the drawings, FIGS. 1A-E schematically illustrate different exemplary motorized wheels with in-wheel suspension, in accordance with embodiments of the present invention. FIG. 1A illustrates a motorized wheel 1a that includes a rim 2a (optionally wearing a tire; not shown), a hub 3a and at least one structural member 6a provided and connected in-between. Hub 3a is fixedly connected to a drive shaft 4a, shown rotating in the figure, and connected to a torque source 5a (the figure shows direct coupling between drive shaft 4a and torque source 5a, although they may be linked indirectly), which may be an engine or a motor, internal combustion and/or electric based. Drive shaft 4a may be fixedly interconnected between toque source 5a and hub 3a, or it may have at least one degree of freedom for motions relative to them. Optionally drive shaft 4a includes a constant-velocity (CV) joint, which allows it to transmit power through a variable angle, at constant rotational speed, without an appreciable increase in friction or play. Torques produced by torque source 5a rotate drive shaft 4a and hub 3a unitarily (i.e., as a single unit) in chosen velocities and accelerations. In some embodiments, structural member 6*a* is positioned eccentrically to wheel's rotation-axis thereby allowing moment buildup resistive to a relative motion between rim 2*a* and hub 3*a* under torques, optionally rotational motions and/or radial motions. In some embodiments, structural member 6*a* is designed and configured such to prevent relative rotational motion between hub 3*a* and rim 2*a* so that torques produced by torque source 5*a* rotate drive shaft 4*a*, hub 3*a* and rim 2*a* unitarily. Optionally and alternatively, structural member 6*a* is configured to change in shape and/or size (e.g., lengthen or shorten) only above a predetermined and/or pre-set threshold value (e.g., a force, moment, acceleration, velocity or other) thereby creating a relative motion between hub 3*a* and rim 2*a*; optionally structural member 6*a* is changeable in size and/or shape relative to a nominal size and/or shape thereof, optionally a pre-set nominal size and/or shape; optionally the change in shape and/or size is recoverable (i.e., back to exact original shape and/or size, optionally a nominal, optionally pre-set, shape and/or size) so that the relative motion is reversed and hub 3*a* and rim 2*a* regain their previous (e.g., nominal, optionally pre-set) relative positioning (e.g., concentricity); the relative motion may be only planar and perpendicular to wheel rotation-axis, optionally including at least one of a radial motion and rotational motion.

In some embodiments, structural member 6*a* is part of a suspension unit. In some embodiments, structural member 6*a* includes a motion resisting component (not shown). Optionally, the motion resisting component is adapted to retain the structural member at its nominal size and/or shape under torques produced by torque source 5*a*, optionally including a predetermined maximal torque (e.g., a torque that torque source 5*a* or any controller thereof is limited up to). Optionally, the motion resisting component includes a suspension spring (not shown), optionally a coil spring or a gas spring, optionally a compression spring. In some embodiments, the suspension spring is provided preloaded to compress only at compressive forces acting thereto beyond a threshold value. Optionally, structural member 6*a* is configured to compress the suspension spring at lengthening thereof and at shortening thereof. Optionally, the suspension spring compresses substantially the same at lengthening and shortening of structural member 6*a* if equally displaced from its nominal length. In some embodiments, structural member 6*a* includes a damper adapted to dissipate kinetic energy to heat during radial displacements; optionally the damper is hydraulic damper, optionally combining gas spring functionality.

In some exemplary embodiments, a wheel according to the present invention is a hub-motor type wheel and its hub includes a hub motor comprising a stator member and a rotor member. FIG. 1B illustrates a motorized wheel 1*b* that includes a rim 2*b* (optionally wearing a tire; not shown), a hub motor 7*b* and at least one structural member 6*b* provided and connected in-between. Hub motor 7*b* may include an electric motor, optionally a DC motor, optionally a permanent magnet motor and/or optionally either a brushless motor or a brushed motor. Hub motor 7*b* includes a stator member 3*b* that is fixedly connectable to a vehicle body (e.g., a frame or a chassis), optionally comprising coils windings as needed connected to a power source 5*b* (e.g., a battery), either directly or through electrical components (not shown), by at least one electrical cord 8*b*. A rotor member 4*b* is rotatably coupled around stator member 3*b*, optionally including a series of permanent magnets evenly distributed on its inner surface opposing stator member 3*b*. Hub motor electromagnetic fields are supplied to the stationary windings of stator member 3*b*. Rotor member 4*b* follows those fields and thereby turning around stator member 3*b* according to the power regime applied. As such, hub motor 7*b* may be considered in this embodiment as wheel's torque source producing torques as needed and up to a max torque (permitted and/or achievable) and causing rim 2*b* in chosen velocities and accelerations.

In some embodiments, structural member 6*b* is positioned eccentrically to wheel's rotation-axis thereby allowing moment buildup resistive to a relative motion between rim 2*b* and rotor member 4*b* under torques, optionally rotational motions and/or radial motions. In some embodiments, structural member 6*b* is designed and configured such to prevent any relative rotational motion between rotor member 4*b* and rim 2*b* so that they will rotate unitarily. Optionally and alternatively, structural member 6*b* is configured to change in shape and/or size (e.g., lengthen or shorten) only above a predetermined and/or pre-set threshold value (e.g., a force, moment, acceleration, velocity or other) thereby creating a relative motion between rotor member 4*b* and rim 2*b*; optionally structural member 6*b* is changeable in size and/or shape relative to a nominal size and/or shape thereof, optionally a pre-set nominal size and/or shape; optionally the change in shape and/or size is recoverable (i.e., back to exact original shape and/or size, optionally a nominal, optionally pre-set, shape and/or size) so that the relative motion is reversed and rotor member 4*b* and rim 2*b* regain their previous (e.g., nominal, optionally pre-set) relative positioning (e.g., concentricity); the relative motion may be only planar and perpendicular to wheel rotation-axis, optionally a radial motion only, optionally a rotational motion only or optionally any combination thereof.

In some embodiments, structural member 6*b* is part of a suspension unit. In some embodiments, structural member 6*b* includes a motion resisting component (not shown). Optionally, the motion resisting component adapted to retain the structural member at its nominal size and/or shape under torques produced by hub motor 7*b*, optionally including a predetermined maximal torque (e.g., a torque that torque source 5*b* or any controller thereof is limited from passing). Optionally, the motion resisting component includes a suspension spring (not shown), optionally a coil spring or a gas spring, optionally a compression spring. In some embodiments, the suspension spring is provided preloaded to compress only at compressive forces acting thereto beyond a threshold value. Optionally, structural member 6*b* is configured to compress the suspension spring at lengthening thereof and at shortening thereof, optionally compressible to the same degree if lengthening and shortening are equally displaced from the nominal length of structural member 6*b*. In some embodiments, structural member 6*b* includes a damper (not shown) adapted to dissipate kinetic energy to heat during said radial displacements; optionally the damper is hydraulic damper, optionally combining gas spring functionality.

Reference is now made to FIG. 1C which illustrates a motorized wheel 1*c* that includes a rim 2*c* (optionally wearing a tire; not shown), a hub 7*c* and at least one structural member 6*c* provided and connected in-between. Hub 7*c* includes a stationary member 5*c* that is fixedly connected or connectable to a vehicle body (e.g., a frame or a chassis). A rotational member 3*c* is rotatably coupled around stationary member 5*c*. A drive shaft 4*c*, shown rotating in the figure, is fixedly connected or connectable with its first end to rim 2*c* center and connected to a torque source (not shown) with its second end, which may be an engine or a motor, internal combustion and/or electric based.

Drive shaft 4c may be fixedly interconnected between torque source and rim 2c, or it may have at least one degree of freedom for motions relative to them. Optionally drive shaft 4c includes a constant-velocity (CV) joint, which allows it to transmit power through a variable angle, at constant rotational speed, without an appreciable increase in friction or play. Torques produced by torque source rotate drive shaft 4c and rim 2c unitarily (i.e., as a single unit) in chosen velocities and accelerations.

In some embodiments, structural member 6c is positioned eccentrically to wheel's rotation-axis thereby allowing moment buildup resistive to a relative motion between rim 2c and hub rotational member 3c under torques, optionally rotational motions and/or radial motions. In some embodiments, structural member 6c is designed and configured such to prevent relative rotational motion between rotational member 3c and rim 2c so that the applied torques rotate drive shaft 4c, rim 2c and rotational member 3c unitarily. Optionally and alternatively, structural member 6c is configured to change in shape and/or size (e.g., lengthen or shorten) only above a predetermined and/or pre-set threshold value (e.g., a force, moment, acceleration, velocity or other) thereby creating a relative motion between rim 2c and rotational member 3c; optionally structural member 6c is changeable in size and/or shape relative to a nominal size and/or shape thereof, optionally a pre-set nominal size and/or shape; optionally the change in shape and/or size is recoverable (i.e., back to exact original shape and/or size, optionally a nominal, optionally pre-set, shape and/or size) so that the relative motion is reversed and rotational member 3c and rim 2c regain their previous (e.g., nominal, optionally pre-set) relative positioning (e.g., concentricity); the relative motion may be only planar and perpendicular to wheel rotation-axis, optionally including at least one of radial motion and rotational motion.

In some embodiments, structural member 6c is part of a suspension unit. In some embodiments, structural member 6c includes a motion resisting component (not shown). Optionally, the motion resisting component adapted to retain the structural member at its nominal size and/or shape under torques produced by torque source 5a, optionally including a predetermined maximal torque (e.g., a torque that the torque source any controller thereof is limited from passing). Optionally, the motion resisting component includes a suspension spring (not shown), optionally a coil spring or a gas spring, optionally a compression spring. In some embodiments, the suspension spring is provided preloaded to compress only under compressive forces beyond a threshold value. Optionally, structural member 6c is configured to compress the suspension spring at lengthening thereof and at shortening thereof, optionally compressible to the same degree if lengthening and shortening are equally displaced from the nominal length of structural member 6c. In some embodiments, structural member 6c includes a damper adapted to dissipate kinetic energy to heat during said radial displacements; optionally the damper is hydraulic damper, optionally combining gas spring functionality.

A slightly different version to wheel 1c is shown in FIG. 1D where instead of the motion resisting component lying within rim boundaries (optionally contained within and/or combined with the structural member), it is protruding therefrom. This option may be chosen especially if the radial distance and space between rim inner surface and hub outer surface is too small to allow proper suspension factors, such as needed stroke and/or room for containing appropriate components, such as a spring and/or a damper. As shown in FIG. 1D, a motorized wheel 1d includes a rim 2d (optionally wearing a tire; not shown), a hub 7d and at least one structural member 6d provided and connected in-between.

Hub 7d includes a stationary member 5d that is fixedly connected or connectable to a vehicle body (e.g., a frame or a chassis). A rotational member 3d is rotatably coupled around stationary member 5d. A drive shaft 4d, shown rotating in the figure, is fixedly connected or connectable with its first end to rim 2d center and connected to a torque source (not shown) with its second end, which may be an engine or a motor, internal combustion and/or electric based. Drive shaft 4d may be fixedly interconnected between toque source and rim 2d, or it may have at least one degree of freedom for motions relative to them. Optionally drive shaft 4d includes a constant-velocity (CV) joint, which allows it to transmit power through a variable angle, at constant rotational speed, without an appreciable increase in friction or play. Torques produced by torque source rotate drive shaft 4d and rim 2d unitarily (i.e., as a single unit) in chosen velocities and accelerations.

A motion resisting component 8d is positioned outside rim 2d boundaries, fully or partially, optionally in the space between rim 2d and vehicle's body (not shown). Motion resisting component 8d and structural member 6d are linked with a link 9d, optionally mechanically linked, such that change of size and/or shape and/or position and/or orientation of structural member 6d is made and/or controlled by motion resisting component 8d. Optionally, link 9d creates a mechanical advantage between motion resisting component 8d and structural member 6d, so that forces supporting relative positioning therebetween or forces changing such positioning are substantially greater than the actual forces applied by motion resisting component 8d. Link 9d may be a hydraulic/pneumatic link optionally comprising at least one piston (optionally, for mechanical advantage, such a link will include at least two pistons of different diameters). Optionally and alternatively, link 9d includes a lever pivoting about a fulcrum having a total length divided between a first arm having a first length provided between a connection point with structural member 6d and fulcrum, and a second arm having a second length provided between fulcrum and a connection point with motion resisting component 8d, optionally the arms are horizontal or are acute, right or obtuse (optionally, for mechanical advantage, in such a link, the first arm should be shorter than the second arm). Optionally and alternatively, link 9d includes a pulley about which a cable or a band can move interconnecting motion resisting component 8d and structural member 6d.

In some embodiments, structural member 6d is rigid enough to maintain a chosen relative positioning between hub 76 and rim 2d under any developed force and acceleration. Optionally, upon repositioning and/or change in orientation with respect to rim 2d, structural member 6d creates and/or limits relative motion (radial and/or rotational) between rim 2d and hub rotational member 3d. Motion resisting component 8d may include a spring and/or a damper, optionally housed in a length changeable container having one member slidable with a second member, optionally the container lengthen or shorten equally with respect to a nominal predetermined and/or pre-set length.

In some embodiments, structural member 6d is positioned eccentrically to wheel's rotation-axis thereby allowing moment buildup resistive to a relative motion between rim 2d and hub rotational member 3d under torques, optionally rotational motions and/or radial motions, upon positioning thereof by motion resistive component 8d. In some embodiments, structural member 6d and motion resisting component 8d are designed and configured such to prevent relative rotational motion between rotational member 3*d* and rim 2*d* so that the applied torques rotate drive shaft 4*d*, rim 2*d* and rotational member 3*d* unitarily. Optionally and alternatively, motion resistive component 8*d* is configured to change in shape and/or size (e.g., lengthen or shorten) only above a predetermined and/or pre-set threshold value (e.g., a force, moment, acceleration, velocity or other) thereby creating a relative motion between rim 2*d* and rotational member 3*d*; optionally motion resistive component 8*d* is changeable in size and/or shape relative to a nominal size and/or shape thereof, optionally a pre-set nominal size and/or shape; optionally the change in shape and/or size is recoverable (i.e., back to exact original shape and/or size, optionally a nominal, optionally pre-set, shape and/or size) so that the relative motion is reversed and rotational member 3*d* and rim 2*d* regain their previous (e.g., nominal, optionally pre-set) relative positioning (e.g., concentricity); the relative motion may be only planar and perpendicular to wheel rotation-axis, optionally including at least one of a radial motion and a rotational motion.

In some embodiments, structural member 6*d* and/or motion resisting component 8*d* are part of a suspension unit. Optionally, motion resisting component 8*d* is adapted to retain structural member 6*d* at its nominal size and/or shape under torques produced by a torque source, optionally including a predetermined maximal torque (e.g., a torque that the torque source any controller thereof is limited from passing). Optionally, motion resisting component 8*d* includes a suspension spring (not shown), optionally a coil spring or a gas spring, optionally a compression spring. In some embodiments, the suspension spring is provided preloaded to compress only at compressive forces acting thereto beyond a threshold value. Optionally, motion resisting component 8*d* is configured to compress the suspension spring at lengthening thereof and at shortening thereof, optionally compressible to the same degree if lengthening and shortening are equally displaced from the nominal length of motion resisting component 8*d*. In some embodiments, motion resisting component 8*d* includes a damper adapted to dissipate kinetic energy to heat during said radial displacements; optionally the damper is hydraulic damper, optionally combining gas spring functionality.

In some exemplary embodiments, a wheel according to the present invention includes or is supported by or is connected to a vehicle's frame or chassis with a traction unit configured to maintain chosen friction between a rolling wheel tire and height changing surfaces. Optionally, the traction unit is connected the wheel (optionally to a non-rotational part thereof) at a first end thereof and connected or connectable to a vehicle chassis at a second end thereof. The traction unit may employ a traction spring configured to partially compress but not fully compress upon vehicle's own weight, and/or optionally to partially compress but not fully compress upon a maximal allowed complete weight of vehicle and load, for example when all vehicles wheels are horizontally leveled. Reference is made to FIG. 1E showing a motorized wheel 1*e* similar to wheel 1*a* of FIG. 1A (although it can be similar instead to any of wheels 1*b*, 1*c* and 1*d*, shown in FIGS. 1B, 1C, and 1D, respectively) that includes a rim 2*e* (optionally wearing a tire; not shown), a hub 3*e* (fixedly connected to a drive shaft 4*e*, shown rotating in the figure) and at least one structural member 6*e* provided and connected in-between. Wheel 1*e* is rotatable around a rotation-axis and incorporating a torque source (for example, torque source being hub motor 7*b* shown in FIG. 1B) or connectable to a torque source (for example, torque source 5*a* shown in FIG. 1A, being an engine or a moter).

In some embodiments, wheel 1*e* includes or is supported by and/or connected with a traction unit 7*e* connected (optionally indirectly, as shown) to hub 3*e* at a first end thereof and connected or connectable to a vehicle chassis 5*e* (shown in part) at a second end thereof.

Traction unit 7*e* may include a spring and/or a damper, optionally housed in a length changeable container having one member slidable with a second member (although, optionally and alternatively, other means may be used, such as a leaf spring), optionally the container lengthen or shorten equally with respect to a nominal predetermined and/or pre-set length. In some embodiments, traction unit 7*e* includes a traction spring that is configured to partially compress but not fully compress upon vehicle's own weight, and/or optionally to partially compress but not fully compress upon a maximal allowed complete weight of vehicle and load, for example when all vehicles wheels are horizontally leveled.

In some embodiments, structural member 6*e* includes a suspension spring (not shown), such as a gas spring. Optionally, structural member 6*e* is configured to compress the suspension spring at lengthening thereof and at shortening thereof. Optionally, the suspension spring is provided preloaded to compress only at compressive forces acting thereto beyond a threshold value. In some embodiments, the threshold value relates to a threshold weight being equal or greater than a minimal weight necessary to fully compress the traction spring in traction unit 7*e*. Optionally, alternatively or additionally, the threshold value relates to a threshold weight being equal or greater than vehicle's own weight and below a minimal weight necessary to fully compress the traction spring. Optionally, alternatively or additionally, the threshold value relates to a threshold force being equal or greater than a chosen threshold breaking value. Optionally, alternatively or additionally, the threshold value relates to a threshold acceleration being equal or greater than a chosen comfortable acceleration or braking magnitudes, such as equal or greater than 2 m/sec^2. Optionally, alternatively or additionally, the threshold value relates to a threshold acceleration being equal or greater than a chosen emergency braking magnitude, such as equal or greater than 5 m/sec^2.

Figure 2:
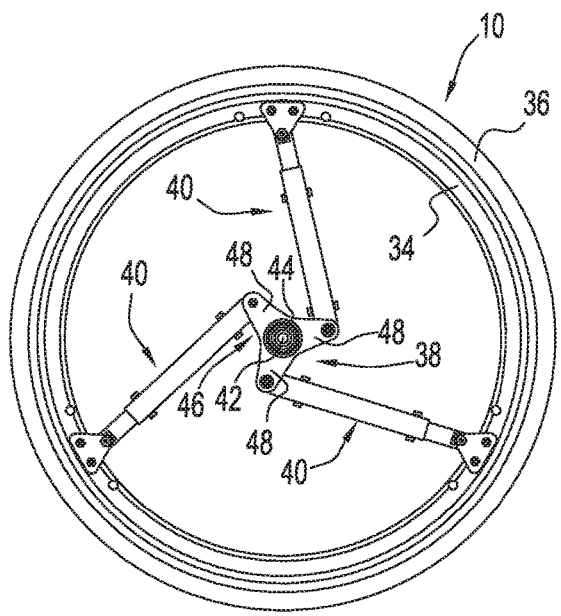
FIG. 2 illustrates a front view of an exemplary wheel design comprising three structural members rotationally-symmetric around a rotation axis, in accordance with embodiments of the present invention.
Figure 3A:
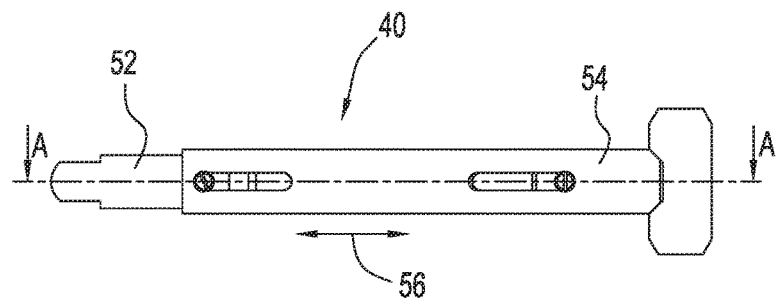
FIGS. 3A-3F schematically illustrate side cut views of the structural member shown in FIG. 2 in different damping situations, in accordance with embodiments of the present invention.
Figure 3B:
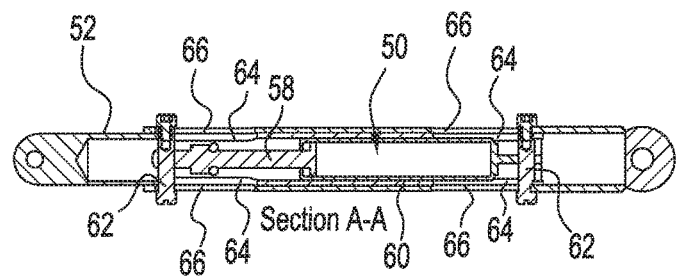
Figure 3C:
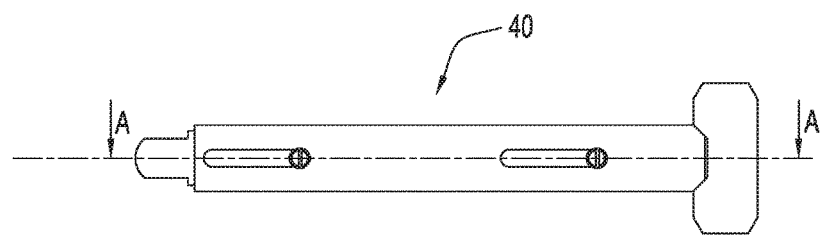

Reference is now made to FIG. 2 which illustrates a front view of an exemplary wheel design 10 comprising three structural members 40 rotationally-symmetric around a rotation axis 42, and also to FIGS. 3A-C that schematically illustrate side cut views of a single structural member 40 in different damping situations, in accordance with embodiments of the present invention. Wheel 10 comprises a rim 34 carrying a tire 36. The rim 34 is connected to a hub 38 by the three structural members 40. A rotation-axis 42 is shown at the center of hub 38, being in this embodiment surrounded by bearing 44. The inner ring of the bearing 44 can be fixated relative to rotation-axis 42 and the outer ring of the bearing 44 is fixed to a connecting member 46 having three arms 48. The arms 48 are particularly arranged radially to rotation-axis 42. The structural members 40 are connected to the outer end portions of the arms 48 so that the structural members 40 are not arranged in a radial manner in the wheel. To damp a stroke or the like, the length of the structural members 40 vary damping the stroke.

Within the drawings of FIGS. 3A-3F, the structural members 40 are shown in different damping situations. In a regular, normal situation (i.e., hub 38 is concentric with rim 34), each of the structural members 40 centralized and are not compressed or elongated, and a gas-spring 50 provided therein is substantially preloaded (e.g., it is held compressed to a length being substantially smaller than its non-stressed length). Structural members 40 comprise two longitudinal elements 52 and 54, whereby the cylindrical element 54 surrounds the inner cylindrical element 52. Therefore, it is possible to move the two longitudinal elements 52, 54, relative to each other in a longitudinal direction 56. Within the inner longitudinal element 52, the spring 50 is located. Spring 50 comprises a piston 58, being located within a cylinder 60. The cylinder 60 is, for example, filled with compressed gas or oil. Spring 50 is preloaded since at nominal position, the pins 62 are distanced such that the spring is already compressed to the threshold value. Only above the threshold it can be further compressed. The end portions of spring 50, i.e. of the cylinder 60 and the rod 58, are each connected to a pin-like tracked sliding element 62. The pin-like tracked sliding elements are passing through slits 64 of the inner longitudinal element 52 and slits 66 of the outer longitudinal element 54. Due to the slits 64 and 66, a movement of the two longitudinal elements 52, 54 in longitudinal direction 56 is possible. Slits length provide boundaries to such relative motion, above which pins 62 are forced to move.

Figure 3D:
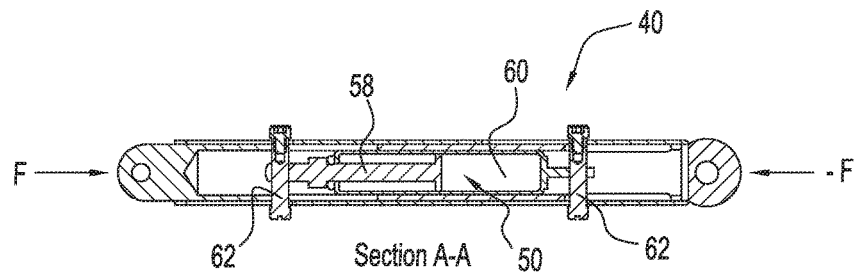

As shown in FIGS. 3C-3D, combined acting forces F and −F compress structural member 40. The force actuates and compresses spring 50, due to the fact that rod 58 is pressed into the cylinder 60 compressing the air in the cylinder 60. Optionally and additionally, spring 50 acts as a damper so that some of the kinetic energy invested by the force work is dissipated and the stroke is absorbed. Additionally, the left tracked sliding element 62 is moved within left slits 64, 66. The right tracked sliding element 62 remains in place.

Figure 3E:
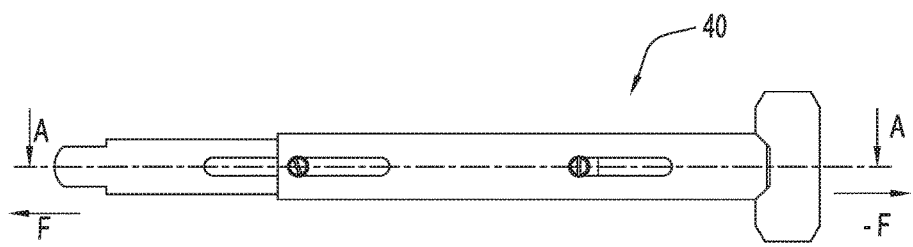
Figure 3F:
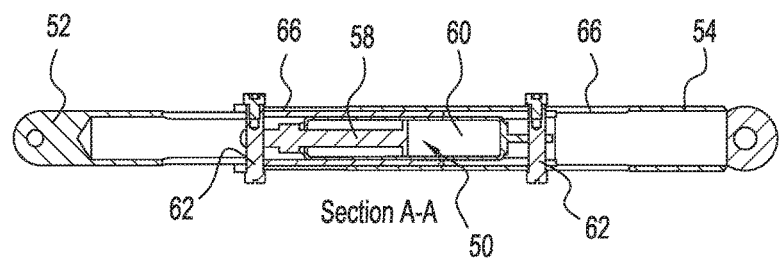

In some embodiments, when at least one structural member 40 is being shorten there is at least a second structural member 40 being elongated, optionally at same extent, optionally to a different extent. In some such embodiments, springs and/or damper installed in both structural members shall compress during the first structural member compression and the second structural member elongation, such that both springs and/or dampers contribute to the overall mechanical energy storage and/or damping, respectively. Reference is now made to FIGS. 3D-3E, showing that the structural member 40 is now elongated by a force F. According to the invention, the spring 50 is compressed, i.e. the rod 58 is, for example, compressing gas provided in the cylinder 60, even if the structural member 40 is elongated. This is possible due to the fact that in this case, the left tracked sliding element 62 is held in place compared to the normal position (FIGS. 3A-3B), whereby the right tracked sliding element 62 is moved to the left in FIGS. 3E-3F. This movement is possible since the right tracked sliding element 62 can be moved to the left inside the slit 66 of the outer longitudinal element 54, whereby this movement is caused by moving the inner longitudinal element 52 to the left in FIGS. 3E-3F.

Figure 4A:
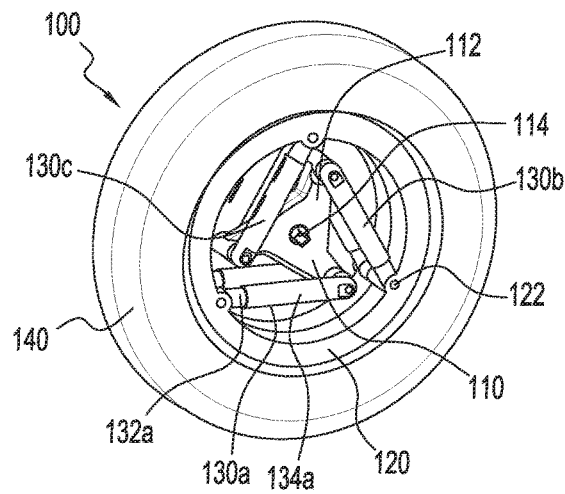
FIGS. 4A-C illustrate views of another exemplary wheel design comprising six structural members in compacted packing, in accordance with embodiments of the present invention.
Figures 4B, 4C:
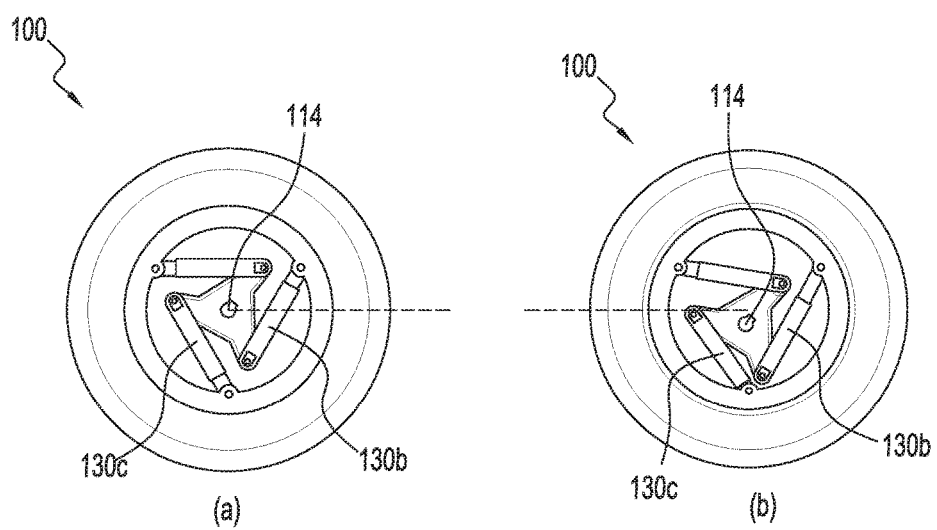

FIGS. 4A-C illustrate views of another exemplary wheel design 100 rotatable around rotation axis 114 and comprising three pairs of structural members 130a, 130b and 130c provided in compacted packing within boundaries of a rim 120, and connected between rim 120 and a hub 110, in accordance with embodiments of the present invention. Rim 120 is shown wearing a tire 140, optionally a pneumatic or solid tire. Optionally, all pairs are substantially identical in design and/or mechanical properties, optionally all structural members are substantially identical in design and/or mechanical properties. In some embodiments, hub 110 is unitary and substantially rigid with a central opening for connecting with a drive shaft, and includes three radial extensions such as arm 112. Each structural member pairs, such as structural member 130b, are pivotally connected with one end to a corresponding arm, such as arm 112, and pivotally connected with a second end to a corresponding bulge of rim 120, such as bulge 122. Similarly to structural members 40 of wheel 10 in FIG. 2, each structural member, such as structural member 130a, includes two members slidably connected with each other, such as an inner member 132a connected to rim 120 and outer member 134a connected to hub 110, housing together a spring and/or damper. Unlike wheel 10 in FIG. 2, wheel 100 is substantially smaller in diameter and/or has much smaller space between hub 110 and rim 120, therefore the need to further compact packing of the structural members. Wheel 100 may be used as drive wheel for a powered wheelchair (PWC), optionally of size (diameter) 12 or 14 inches. In case of a 14" PWC wheel, hub 110 geometry is bounded (including its arms/extensions) in a circle which may be 50-100 mm, optionally about 75 mm, in diameter, whereas rim 120 inner diameter may be 100-200 mm, optionally about 170 mm. Optionally, maximal relative radial motion between rim hub 110 and rim 120 is 5 to 30 mm, optionally 15 mm. The use of pairs instead of single structural members connected to each hub arm is optional and determined according to need for increased strengthening to high vehicle/load weights, increased lateral stability and strength and/or increased resistance to and optional damping of rim's yawing and/or pitching motions relative to hub, in case such are applicable.

In some embodiments, structural members packing is determined by the angle between each structural member and arm/extension in hub 110 it is connected to when hub 110 and rim 120 are concentric together and to wheel's rotation-axis. As shown in the geometry, there may be a design tradeoff between the need for packing compactly the structural members, provided a chosen height and maximally allowed extension length of the structural member, and the needed torque resistance efficiency by the structural members, in order to resist relative motion between hub 110 and rim 120 at all or at certain torques; so instead of a substantially perpendicular positioning of a structural member and its corresponding hub arm/extension in a wheel such as wheel 10 in FIG. 2, the wheel 100 in FIG. 4A has its structural members substantially acute with respect to corresponding hub 110 extensions/arms.

FIGS. 4B and 4C illustrate two possible scenarios. FIG. 4B shows scenario (a) where rim 120 is concentric to rotation-axis 114, possibly if weight working at hub 110 and/or if an impact to rim 120 do not overcome springs' threshold, and FIG. 4C shows scenario (b) where rim 120 is eccentric to rotation axis 114, possibly if weight working at hub 110 and/or if an impact to rim 120 overcome springs' threshold. In scenario (a) all structural members, such as structural members 130b and 130c are in nominal length while in scenario (b) the structural members undergo different length changes, for example and as shown, structural member 130b lengthens and structural member 130c shortens. As shown, in scenario (b) hub 110 shifts downwards relative to rim 120 and optionally this radial movement is recoverable so that wheel 100 resumes into its nominal geometry proportions as shown in scenario (a) once weight and/or influences of acting impacts or forces get back beneath springs' threshold.

Figure 5A:
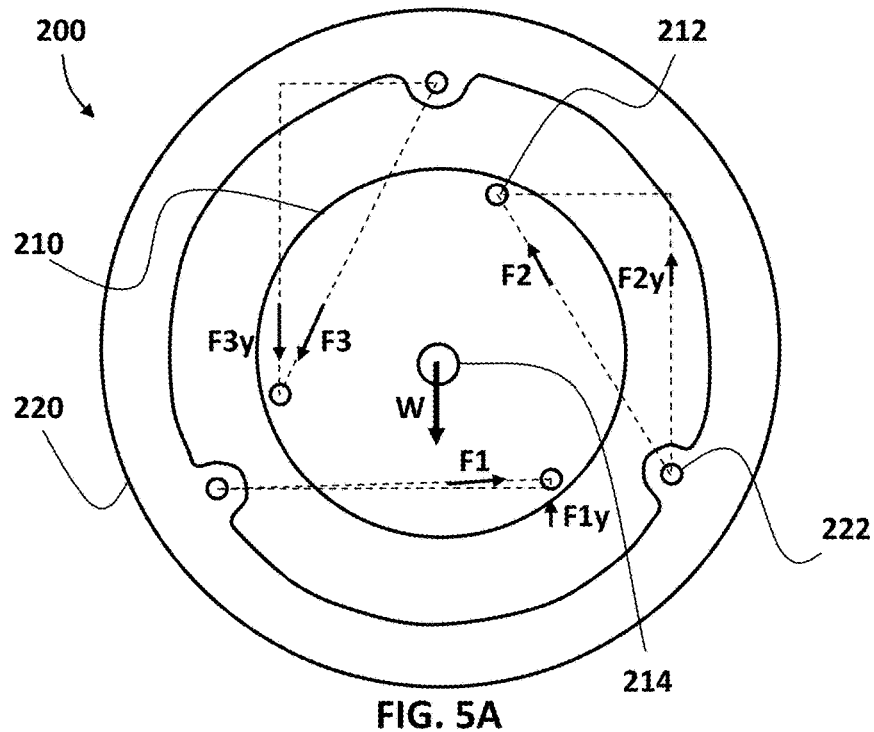
FIGS. 5A-B schematically illustrate forces distribution in a wheel, in accordance with embodiments of the present invention.
Figure 5B:
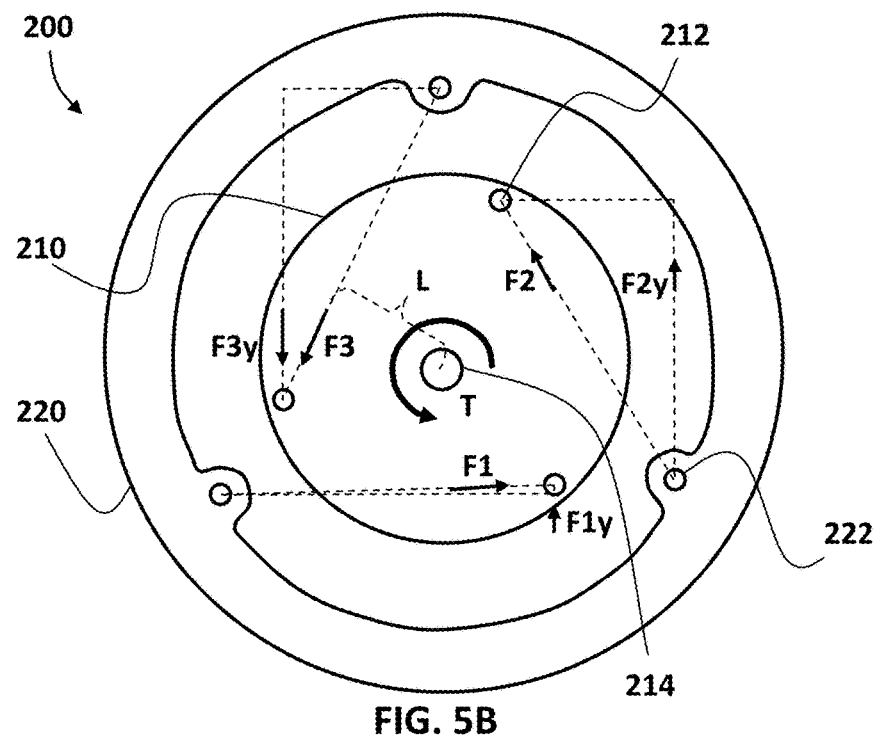

Reference is made to FIGS. 5A-B which schematically illustrate forces distribution in a wheel 200, in accordance with embodiments of the present invention. Wheel 200 may be any of the above mentioned wheels or others, and may be sized, shaped, designed and configured for connections with motorized vehicles or other transportation devices configured to deliver torques to wheel's hub or rim or anywhere in-between; these include but not limited to: powered or power-assisted wheelchairs, self-propulsion bicycles and electric bicycles, e-bikes, cars, trucks, trolleys, self-balancing transportation devices including gyroscopically controlled vehicles (such as Segway™ by Segway Inc).

Wheel 200, which is rotational around a rotation axis 214, incorporates a suspension unit (not shown) provided between a hub outer periphery 210 and a rim 220. In some embodiments and as shown, suspension unit in wheel 200 keeps tangential symmetry so that a similar suspension effect will be achieved at all possible impact angles. Furthermore, suspension unit in wheel 200 is configured to keep concentricity between rim 220 and hub periphery 210 and rotation-axis 214 at presence of at least one of vehicle's self-weight, acceleration and deceleration (braking), and different impact magnitudes and angles. Optionally, the suspension unit is preloaded in all directions to a similar extent.

In some embodiments, suspension unit of wheel 200 includes a segmental anti-symmetrical design, comprising of at least three structural members connecting between hub 210 and rim 220, preferably evenly displaced, each structural member is pivotally connected at a first end thereof to a peripheral port in hub 210 (such as port 212) and at a second end thereof to an inward port in rim 220 (such as bulge 222), all structural members having their vector of operation off-center to rotation axis 214. As shown, wheel 200 is subject to a weight W acting downwards at its center and/or to a rotation torque T which may be applied by a motor or by any other device (including bicycle's pedals), either at hub 210, at rim 220 or anywhere in-between. The resistive opposite forces to weight W developed by the structural members, namely forces F1, F2 and F3, projects in the direction of their corresponding structural members' longitudinal axes. The combined force which resists weight W by the structural members is $F1y+F2y+F3y$, based on the forces vertical components. The resistive opposite moment to torque T developed together by the structural members, based on the resistive forces and the lever length L from hub center, is $(F1+F2+F3)*L$. Length L can be calculated using geometric parameters such as distances of port 212 and port 222 to hub center 214, and number of structural members pairs (in this example: 3).

Figures 6A, 6B, 6C:
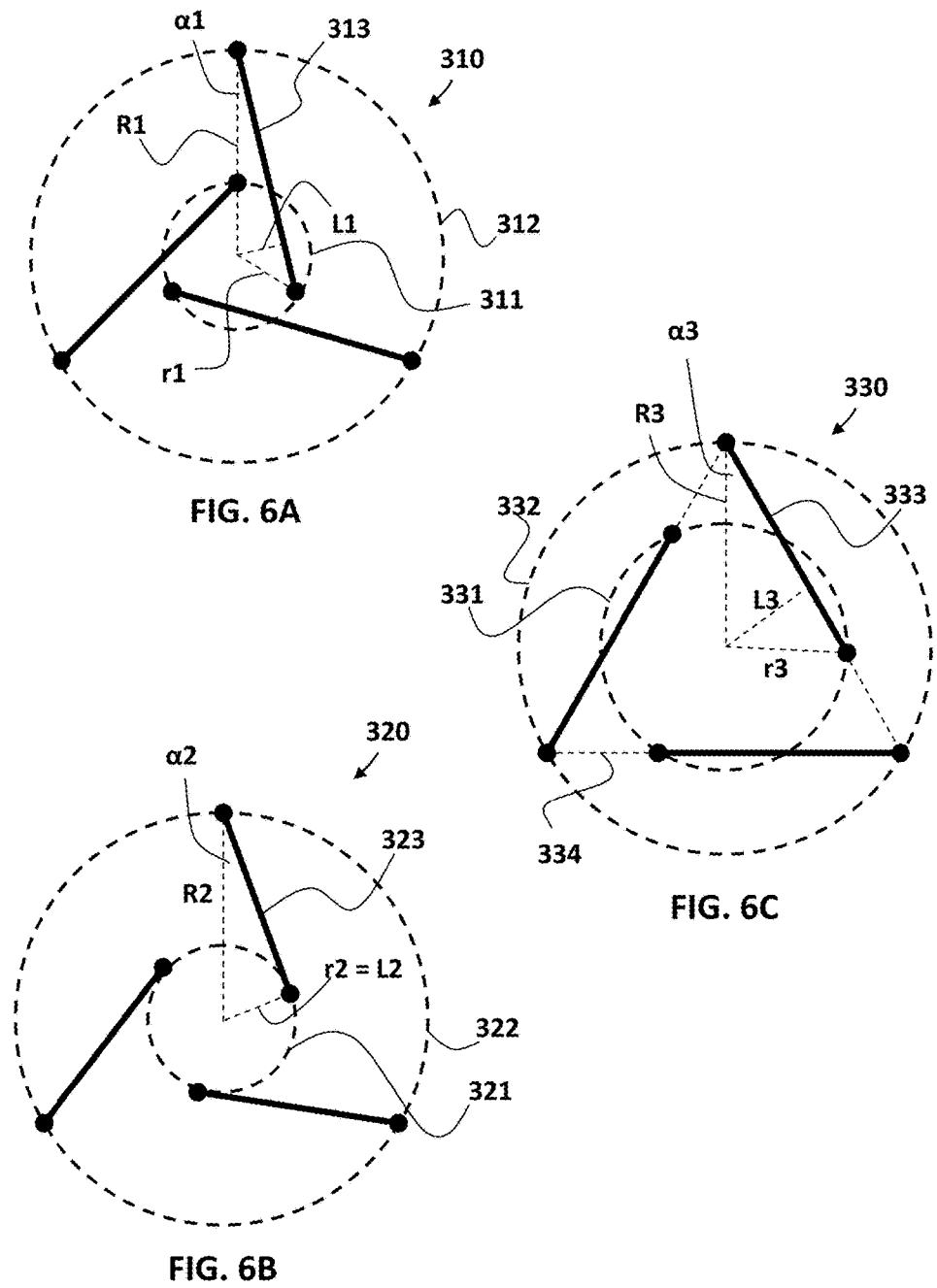
FIGS. 6A-C schematically illustrate different packing orientations of structural members in wheels, in accordance with embodiments of the present invention.
Figure 7A:
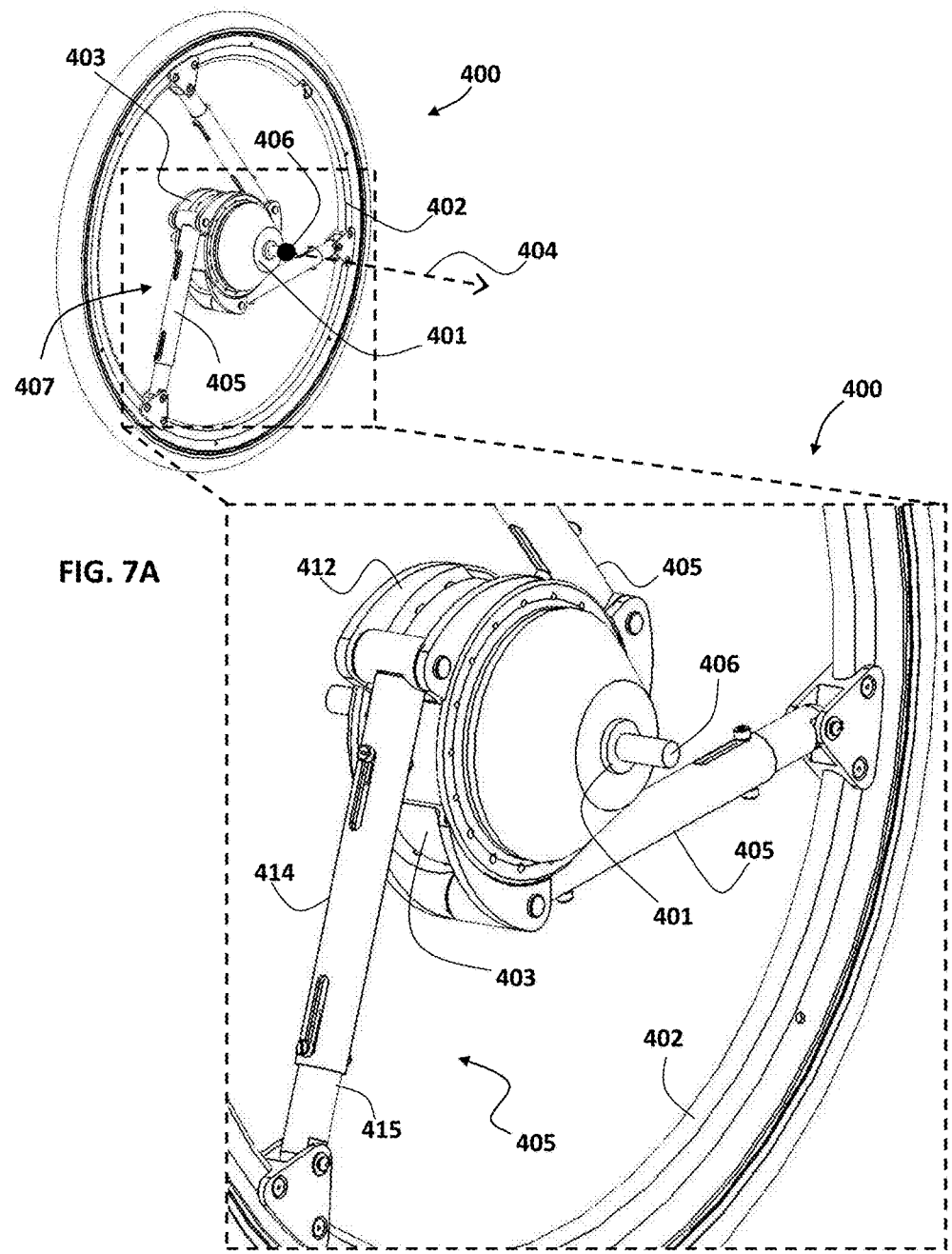
Figure 7D:
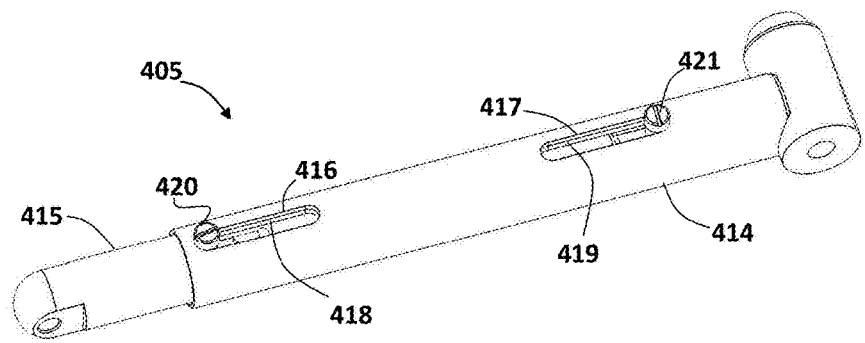

FIGS. 6A-C schematically illustrate different packing orientations of structural members in wheels, in accordance with embodiments of the present invention. FIG. 6A shows a wheel 310 comprising a hub outer boundary 311 (e.g., the outer boundary of a hub motor 403 illustrated in FIG. 7A) having a radius r1, a rim inner boundary 312 (e.g., the inner boundary of rim 402 illustrated in FIG. 7A) having a radius R1, and a plurality (in this example: 3) of structural members, including structural member 313, evenly distributed and rotationally symmetric around wheel 310 center. Two or more structural members 313 may have first ends that are pivotally connected to and equally spaced around rim 312 and may further have second ends that are pivotally connected to and equally spaced around said hub boundary 311. In some embodiments, each structural member 313 may be angularly deviated (e.g., by angles $\alpha 1$, $\alpha 2$ and $\alpha 3$ shown in FIGS. 6A-C, respectively) in a common direction from a radial line (denoted as dashed line connecting the center point of wheel 310 to the inner boundary of rim 312, 322 and 332 in FIGS. 6A-C, respectively) extending from a connection of the structural member to the rim and the center of the wheel. In some embodiments, the structural members are configured to maintain hub 311 and rim 312 concentric and non-rotational even under forces and moments up to a predetermined threshold value, after which a controlled and relative motion and/or recoverable displacement is allowed. Each structural member is pivotally connected at both ends thereof, including a first end connected to rim 312 and a second end connected to hub 311; wherein connections at hub are evenly distributed about hub outer boundary 311 and connections at rim are evenly distributed about rim inner boundary 312. As shown, the structural members shown in nominal form are oriented in an angle a1 relative to vertical rim radius R1 and create a horizontal distance or a "lever length" L1 with respect to wheel center, and considering a fixed radii r1 and R1, angle $\alpha 1$ determines the nominal length of structural member 313. In some embodiments, in order to allow a larger nominal length for structural member 313, a smaller angle $\alpha 1$ can be chosen, for example an angle substantially smaller than 30° (or optionally substantially smaller than $30*(n-2)$ for a wheel comprising n structural members), but optionally substantially greater than 0°; although this will cause lever length L1 to decrease so that a greater minimal threshold may be needed in the structural members to overcome torques applied to wheel 310 without changing concentricity between hub and rim FIG. 6B shows a wheel 320 comprising a hub outer boundary 321 having a radius r2, a rim inner boundary 322 having a radius R2, and a plurality (in this example: 3) of structural members, including structural member 323, evenly distributed and rotationally symmetric around wheel 320 center. In some embodiments, the structural members are configured to maintain hub 321 and rim 322 concentric and non-rotational even under forces and moments up to a predetermined threshold value, after which a controlled and relative motion and/or recoverable displacement is allowed. Each structural member is pivotally connected at both ends thereof, including a first end connected to rim 322 and a second end connected to hub 321; wherein connections at hub are evenly distributed about hub outer boundary 321 and connections at rim are evenly distributed about rim inner boundary 322. As shown, the structural members shown in nominal form are oriented in an angle $\alpha 2$ relative to vertical rim radius R2 so chosen to have tangential relations between structural member 323 and rim outer boundary 322, hence radius r2 equals lever length L2. As such, lever length L2 is maximal possible in length in this example, hence the chosen threshold in each structural member may be smaller for a given torque.

FIG. 6C shows a wheel 330 comprising a hub outer boundary 331 having a radius r3, a rim inner boundary 332 having a radius R3, and a plurality (in this example: 3) of structural members, including structural member 333, evenly distributed and rotationally symmetric around wheel 330 center. In some embodiments, the structural members are configured to maintain hub 331 and rim 332 concentric and non-rotational even under forces and moments up to a predetermined threshold value, after which a controlled and relative motion and/or recoverable displacement is allowed. Each structural member is pivotally connected at both ends thereof, including a first end connected to rim 332 and a second end connected to hub 331; wherein connections at hub are evenly distributed about hub outer boundary 331 and connections at rim are evenly distributed about rim inner boundary 332. As shown, the structural members shown in nominal form are oriented in an angle $\alpha 3$ relative to vertical rim radius R3 and create a lever length L3 with respect to wheel center. In this example, angle $\alpha 3$ equals 30° (or $90*(n-2)/n$ for a wheel comprising n structural members) so that structural member 333 is aligned to a corresponding side of an equilateral triangle 334 inscribed in rim inner boundary 332. This form may be applied especially in cases of a large-diameter hub relative to the rim, with an effective balance between lever length L3 and structural members nominal length.

In the following examples:
L=the lever length;
n=the total number of structural members in the wheel;
N=number of structural members in each cluster (e.g., pair);
$180*(n/N-2)/(n/N)$=internal angle of a regular polygon having n/N sides;
α=angle between a structural member originating from connection to rim at highest point and vertical rim radius;
W=total weight acting at wheel center;
T=Total torque exerted on wheel around its rotation axis;
Fi (i=1, 2, 3, . . . , n)=the equivalent force exerted on structural member i;
Fiy=the vertical component of Fi.

In some embodiments, the threshold value, Ft, that determines the force magnitude in each structural member, above which it will change in length from its nominal size, can optionally be derived as the highest of [a maximal allowed torque, Tm, delivered to the wheel by the torque origin and divided by the length L], and [a maximal allowed weight Wm, which may be chosen according to different factors such as the allowed added load to vehicle's weight, number of wheels, center of gravity, etc.]

Example 1: Calculating Theoretical Minimal Threshold for Exemplary Bicycle

An exemplary driving wheel of a bicycle (rim radius R is 30 cm and hub radius r is 10 cm) is pre-set to retain concentricity under maximal allowed weight Wm of 100 Kg. The maximally allowed torque Tm produced by a torque source (hub motor or human-operated-pedals, in combination with an optional gear mechanism) is 5 Kg*m. The driving wheel includes three structural members, optionally similarly to wheel 10 in FIG. 2 and/or wheel 320 in FIG. 6B.

In summary:
Wm=100 Kg
Tm=5 Kg*m
R=0.3 m
L=r=0.1 m
n=3
N=1

Therefore, Tm/L/n=5/0.1/3=16.67 Kg, meaning that if the resistive components in structural members (e.g., their housed springs) are preloaded above 16.67 Kg then even at maximal allowed torque Tm, under constant or no velocity, and without any external forces acting on the wheel, all structural members will theoretically not change from their nominal length and the hub and rim shall remain concentric.

Likewise, and considering $F1y=F1*\cos(α)$, $F2y=F2*\cos(30+α)$, $F3y=F3*\cos(30-α)$ and $\sin(α)=r/R$, then $α=\arcsin(r/R)=\arcsin(⅓)=19.47°$. So if $Wm=(F1y+F2y+F3y)$ then $F1=F2=F3=100/(\cos(19.47)+\cos(49.47)+\cos(10.53))=2*F2y*\cos(30)$, therefore $F3y=F2y=100/2/\cos(30)=38.82$ Kg, meaning that if the resistive components in structural members are preloaded above 38.82 Kg then even at maximal allowed weight Wm, under no torque, under constant or no velocity, and without any external forces acting on the wheel, all structural members will theoretically not change from their nominal length and the hub and rim shall remain concentric.

Example 2: Calculating Theoretical Minimal Threshold for Exemplary Powered Wheelchair An exemplary driving wheel of a PWC is pre-set to retain concentricity under maximal allowed weight Wm of 150 Kg. The maximally allowed torque Tm produced by a torque source (hub motor or human-operated-pedals, in combination with an optional gear mechanism) is 8 Kg*m. The driving wheel includes six structural members divided as three pairs, and is optionally similar to wheel 100 in FIG. 4A and/or to wheel 330 in FIG. 6C.

In summary:
Wm=150 Kg
Tm=8 Kg*m
L=0.05 m (exemplary lever length)
n=6
N=2

Therefore, Tm/L/n=8/0.05/6=26.67 Kg, meaning that if the resistive components in structural members (e.g., their housed springs) are preloaded above 26.67 Kg then even at maximal allowed torque Tm, under constant or no velocity, and without any external forces acting on the wheel, all structural members will theoretically not change from their nominal length and the hub and rim shall remain concentric.

Likewise, and considering $F2y=F3y$ and F1y0, then $Wm=(2*F1y=2*F2y=2*F3y)=4*F2y*\cos(30)$, therefore $F3y=F2y=150/4/\cos(30)=43.3$ Kg, meaning that if the resistive components in structural members are preloaded above 43.3 Kg then even at maximal allowed weight Wm, under no torque, under constant or no velocity, and without any external forces acting on the wheel, all structural members will theoretically not change from their nominal length and the hub and rim shall remain concentric.

Example 3: Calculating Theoretical Minimal Threshold for Exemplary Private Car

An exemplary driving wheel of a private car is pre-set to retain concentricity under maximal allowed weight Wm of 375 Kg. The maximally allowed torque Tm produced by a torque source (hub motor or human-operated-pedals, in combination with an optional gear mechanism) is 150 Kg*m. The driving wheel includes 10 structural members divided as five pairs.

In summary:
Wm=375 Kg
Tm=150 Kg*m
L=0.2 m (exemplary lever length)
n=10
N=2

Therefore, Tm/L/n=150/0.2/10=75 Kg, meaning that if the resistive components in structural members (e.g., their housed springs) are preloaded above 75 Kg then even at maximal allowed torque Tm, under constant or no velocity, and without any external forces acting on the wheel, all structural members will theoretically not change from their nominal length and the hub and rim shall remain concentric.

Likewise, and considering $F1y=F2y=F3y=F4y$ and $F5y=0$, then $Wm=(2*F1y=2*F2y+2*F3y+2*F4y+2*F5y)=4*F1y*\cos(18)$, therefore $F1y=F2y=F3y=F4y=375/8/\cos(18)=49.29$ Kg, meaning that if the resistive components in structural members are preloaded above 49.29 Kg then even at maximal allowed weight Wm, under no torque, under constant or no velocity, and without any external forces acting on the wheel, all structural members will theoretically not change from their nominal length and the hub and rim shall remain concentric.

Reference is now made to FIGS. 7A-G which illustrate views of an exemplary wheel 400 incorporating a torque source 401, in accordance with embodiments of the present invention. Wheel 400 includes a rim 402 and a hub 403. In some embodiments, hub 403 is in a form of a hub-motor incorporating torque source 401. Torque source 401 is capable of producing torques, up to a maximal torque (e.g., '$T_m$'), for rotating wheel 400, optionally particularly rotating rim 402, around a rotation-axis 404. In some embodiments, hub 403 is rotationally and/or radially fixed to rim 402 under torques smaller than maximal torque $T_m$ and recoverably rotatable and/or displaceable relative to a center point 406 of rim 402 under torques greater than maximal torque $T_m$.

In some embodiments, wheel 400 includes at least one structural member 405 provided at least partially between rim 402 and hub 403. Optionally, by positioning between hub 403 and rim 402, the at least one structural member 405 provides a normally fixed distance and/or optional concentricity therebetween, when it is at its nominal size and/or shape, as shown in FIGS. 7A-G. In some embodiments, the at least one support member 405 is adapted to retain said distance when stressed up to a threshold value and to recoverably alter said distance when stressed over that threshold value.

Optionally, each structural member 405 is part of a suspension unit 407. In some embodiments, suspension unit 407 comprises at least three structural members 405 arranged rotationally-symmetric one with the other around rotation-axis 404 when at least one or each structural member 405 is at its nominal size and/or shape. In some embodiments, center point 406 of rim 402 coincides with rotation-axis 404 when at least one or each structural member 404 is at its nominal size and/or shape. Each structural member 405 is optionally configured to change in size and/or shape, relative to its nominal size and/or shape, during displacements and/or rotations of hub 403 relative to center point 406 of rim 402.

In some embodiments, wheel 400, optionally its suspension unit 407, optionally its at least one structural member 405, includes an at least one motion resisting component 408 (shown in FIG. 7E), which is adapted to retain the at least one structural member 405 at its nominal size and/or shape under torques smaller than the maximal torque producible by torque source 401. Optionally, alternatively or additionally, at least one or each motion resisting component 408 is adapted to resist rotation and/or displacement of hub 403 relative to center point 406 of rim 402. In some embodiments, any or each motion resisting component 408 comprises a suspension spring, such as a gas spring (as shown) or a coil spring. Any or each such suspension spring may be provided preloaded, when a corresponding structural member 405 is at its nominal size and/or shape, may be configured to compress to a smaller length only under compression forces greater than a threshold value. In some embodiments, at least one or each structural member 405 is configured to compress the suspension spring both at lengthening thereof and at shortening thereof, relative to the nominal size and/or shape of the corresponding structural member 405 (similarly to as previously described and shown in FIGS. 3A-F).

In some embodiments, wheel 400, optionally its suspension unit 407, optionally its at least one structural member 405, optionally its at least one motion resisting component 408, includes a damper configured to dissipate kinetic energy during displacements and/or rotations of hub 403 relative to a center point 406 of rim 402. In this particular example, motion resisting component 408 functions both as a gas spring and damper, and optionally includes a piston 409 with at least one minute perforation for facilitating fluid friction of fluids passing therethrough during piston strokes (not shown).

In some embodiments, wheel 400, optionally its hub 403, optionally its torque source 401, comprises a stator member 410 and a rotor member 411 (as shown in FIG. 7C). As shown, stator member 410 may be housed within rotor member 411 and comprise a plurality of radial extensions, such as extension 422, each is wound with an electrically conductive coil for producing electro-magnetic field. Rotor member 411 is freely rotatable around stator member 410 and includes an even number of magnets, such as magnet 423, as the number of radial extensions of stator 410. The magnets are arranged such that each two adjacent magnets have opposite poles. Upon connecting the coils to an electric current source the produced electromagnetic field with cause rotor member 411 to rotate. In some embodiments, a shaft 424 is rotationally fixed to rotor member 411 and is allowed to freely rotate with it. Optionally, shaft 424 is connected or connectable to external toque source (e.g., bicycle pedals, chain or gearing provided therebetween), which may replace, initiate and/or add torque power to torque source 401 embedded in hub 403.

Optionally, the at least one structural member 405 connects rim 402 and hub 403, optionally particularly at rotor member 411. In some embodiments, rotor member 411 is connected at a first portion thereof to a first support member 405a, and at an evenly displaced second portion thereof to a second support member 405b, substantially identical to first support member 405a. In some embodiments, loading hub motor 403, only if to a magnitude greater than a predetermined threshold value, will cause first support member 405a to elongate and second support member 405b to compress, such that a first suspension spring of first support member 405a and a second suspension spring of second support member 405b both compress so that a cumulative compression force thereof resists said loading.

In some embodiments, for example, as shown in FIG. 7C, at least one or each structural member 405 is configured and arranged to generate a continuous variable force, up to a maximal force $F_m$, to a (corresponding) hub portion 412 distant to rotation-axis 404 by a lever arm 413 having a length 'r'. A "lever arm", shall be defined herein as the perpendicular distance from the fulcrum of a lever to the line of action of the effort (e.g., force) or to the line of action of the weight. Upon applying maximal force $F_m$ to hub portion 412, a maximal resisting moment 'M' is created as a product of maximal force $F_m$ and lever arm 413 (i.e., $M=F_m \times r$), being equal to or greater than maximal torque $T_m$ and opposite in direction thereto (i.e., $M \geq -T_m$).

In some embodiments, at least one or each structural member 405 comprises two longitudinal elements being slidably connected to each other, such that the structural member 405 is configured to extend or compress during displacements and/or rotations of hub 403 relative to a center point 406 of rim 402. In some such embodiments, at least one or each structural member 405 comprises an outer longitudinal element 414 enclosing a lumen, and an inner longitudinal element 415 slidable in said lumen. Outer longitudinal element 414 comprises a first outer slit 416 and a second outer slit 417. Inner longitudinal element 415 comprises a first inner slit 418 and a second inner slit 419.

Figure 7E:
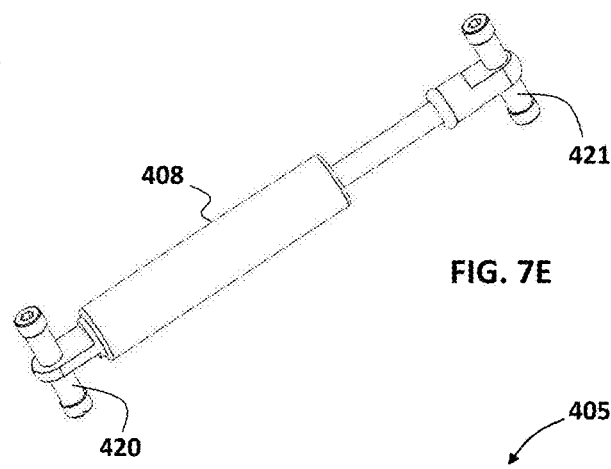
Figure 7F:
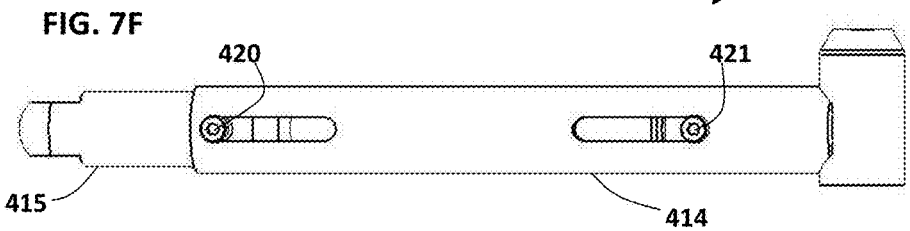
Figure 7G:
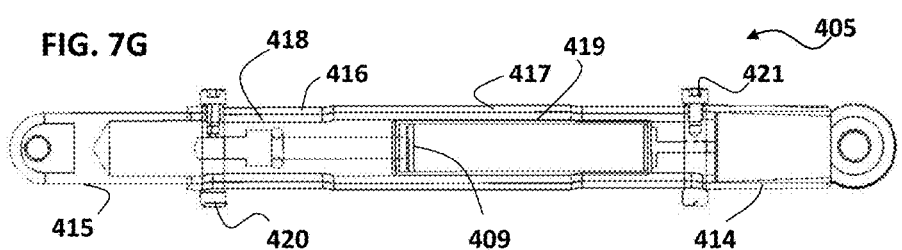

A first sliding pin 420 is provided in first outer slit 416 and first inner slit 418, and a second sliding pin 421 is provided in second outer slit 417 and second inner slit 419. Motion resisting component 408, such as a suspension spring, is connected in this exemplary embodiment with a first end thereof to first sliding pin 420 and with a second end thereof to second sliding pin 421 (as shown in FIG. 7E).

In some embodiments, slits 416, 417, 418 and 419 are sized and arranged such that, at a central relative position between outer longitudinal element 414 and inner longitudinal element 415, the first sliding pin 420 and the second sliding pin 421 are pushed by the suspension spring to a maximal distance. In some such embodiments, at any non-central relative position between outer longitudinal element 414 and inner longitudinal element 415 (either if they slide away from each other thus extending to a greater total length, or if they slide one to the other thus compressing to a shorter total length), the first sliding pin 420 and the second sliding pin 421 are forced to approach each other to a distance smaller than the maximal distance, thereby compressing the suspension spring therebetween.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A motorized wheel with suspension, the motorized wheel comprising:
   (1) a rim;
   (2) a hub motor including a stator member and a rotor member, and being configured for producing torques for rotating the motorized wheel around a rotation-axis; and
   (3) a suspension unit, including:
      (a) at least two structural members, said structural members having first ends that are pivotally connected to and equally spaced around said rim and having second ends that are pivotally connected to and equally spaced around said hub motor, wherein each structural member is angularly deviated in a common direction from a radial line extending from a connection of the structural member to the rim and the center of the wheel,
      wherein said at least two structural members are configured to change in size and/or shape, relative to a nominal size and/or shape thereof, during rotations of said rotor member relative to a center point of said rim, and
      (b) at least two motion resisting components, each component being adapted to retain one of said at least two structural members at said nominal size and/or shape thereof under torques smaller than a predefined threshold torque.

2. A motorized wheel according to claim 1, wherein said at least one structural member connects said rim and said rotor member.

3. A motorized wheel according to claim 1, wherein said center point of said rim coincides with the rotation-axis when said at least one structural member is at said nominal size and/or shape thereof.

4. A motorized wheel according to claim 1, wherein said suspension unit comprises at least three structural members, including said at least one structural member, arranged rotationally-symmetric one with another around said rotation-axis when said at least one structural member is at said nominal size and/or shape thereof.

5. A motorized wheel according to claim 1, wherein said at least one motion resisting component is configured for being fully or partially positioned, so as to protrude, outside of inner boundaries of said rim.

6. A motorized wheel according to claim 1, wherein said at least one structural member and/or said at least one motion resisting component lays completely within a space enclosed with inner boundaries of said rim.

7. A motorized wheel according to claim 1, wherein said at least one structural member comprises two longitudinal elements being slidably connected to each other, such that said at least one structural member is configured to extend or compress during said rotations.

8. A motorized wheel according to claim 1, wherein said at least one structural member comprises said at least one motion resisting component.

9. A motorized wheel according to claim 1, wherein said at least one motion resisting component comprises a suspension spring provided preloaded at said nominal size and/or shape and configured to compress to a smaller length only under compression forces greater than a threshold value.

10. A motorized wheel according to claim 9, wherein said at least one structural member is configured to compress said suspension spring both at lengthening thereof and at shortening thereof, relative to said nominal size and/or shape thereof.

11. A wheel according to claim 9, wherein said threshold value relates to a threshold acceleration being equal or greater than a chosen acceleration or braking magnitude.

12. A wheel according to claim 9, wherein said threshold value relates to a threshold acceleration being equal or greater than a chosen emergency braking magnitude.

13. A motorized wheel according to claim 1, configured for being supported by and/or connected to a traction unit that is connected or connectable to a vehicle chassis.

14. A motorized wheel according to claim 1, configured for being connectable to, or part of, a wheelchair or a bicycle.

15. A motorized wheel according to claim 1, configured for being connectable to, or part of, a motorized vehicle.

* * * * *